(12) United States Patent
Spinelli et al.

(10) Patent No.: US 10,617,133 B2
(45) Date of Patent: Apr. 14, 2020

(54) METHOD AND SYSTEM FOR REMOVING ANTI-NUTRITIONALS FROM A FEED STOCK

(71) Applicant: Nutriati, Inc., Henrico, VA (US)

(72) Inventors: Michael A Spinelli, Moseley, VA (US); Krisan Singh, Midlothian, VA (US); Reinhold Brand, Henrico, VA (US)

(73) Assignee: NUTRIATI, INC., Richmond, VA (US)

( * ) Notice: Subject to any disclaimer, the term of this patent is extended or adjusted under 35 U.S.C. 154(b) by 72 days.

(21) Appl. No.: 15/886,534

(22) Filed: Feb. 1, 2018

(65) Prior Publication Data

US 2018/0255803 A1 Sep. 13, 2018

Related U.S. Application Data

(63) Continuation-in-part of application No. 15/014,882, filed on Feb. 3, 2016, now Pat. No. 10,264,805, which
(Continued)

(51) Int. Cl.
*A23J 1/14* (2006.01)
*A23J 3/14* (2006.01)
(Continued)

(52) U.S. Cl.
CPC ............ *A23J 1/144* (2013.01); *A23J 3/14* (2013.01); *A23L 11/32* (2016.08);
(Continued)

(58) Field of Classification Search
CPC ... A23P 1/06; A23P 10/00; A23P 30/00; A23J 1/14; A23J 1/142; A23J 3/14; A23J 3/16;
(Continued)

(56) References Cited

U.S. PATENT DOCUMENTS 3,895,003 A * 7/1975 Swain .................. A23J 1/14
530/377
2002/0189976 A1* 12/2002 Wilde .................. A23D 9/00
208/308

(Continued)

FOREIGN PATENT DOCUMENTS

CA 1180010 * 12/1984 ............ C07H 17/02

Primary Examiner — Joseph W Drodge
(74) Attorney, Agent, or Firm — Bechen PLLC; Timothy J. Bechen

(57) ABSTRACT

A system and method for anti-nutritional removal includes generating a feed stock from a plant-based protein source, the plant-based protein source having anti-nutritionals disposed therein. The system and method includes generating an ethanol slurry by combining the feed stock with an ethanol wash containing a first volume of ethanol and processing the ethanol slurry through an extractor to generate an ethanol matrix and a feed stock mass. The method and system further includes providing the feed stock mass to a desolventizer and generating a desolventized feed stock mass therefrom. Therein, the method and system includes drying the desolventized feed stock mass to generate a clean feed stock with at least a portion of the anti-nutritionals removed therefrom. In one embodiment, the feed stock may be fava beans with the removal of vicine and covicine as anti-nutritionals.

13 Claims, 12 Drawing Sheets

Related U.S. Application Data is a continuation-in-part of application No. 14/997,744, filed on Jan. 18, 2016, now Pat. No. 10,182,590, which is a continuation-in-part of application No. 14/694,341, filed on Apr. 23, 2015.

(60) Provisional application No. 62/453,151, filed on Feb. 1, 2017.

(51) Int. Cl.
  *A23L 11/30* (2016.01)
  *B01D 11/02* (2006.01)

(52) U.S. Cl.
  CPC ...... *B01D 11/0288* (2013.01); *A23V 2002/00* (2013.01); *A23V 2250/548* (2013.01); *A23V 2300/10* (2013.01); *A23V 2300/14* (2013.01); *A23V 2300/31* (2013.01); *A23V 2300/38* (2013.01)

(58) Field of Classification Search
  CPC .... A23J 1/148; A23J 1/144; A23J 1/00; A23L 5/20; A23L 5/23; A23L 5/30; A23L 5/51; A23L 7/10; A23L 7/115; A23L 7/117; A23L 13/30; A23L 13/42; A23L 13/426; A23L 5/25; A23L 19/00; A23L 11/31; A23L 11/32; A23L 11/33; B01D 11/02; B01D 11/028; B01D 11/0284; B01D 21/01; B01D 21/26; B01D 21/262; B01D 11/0288; C07K 1/14; C07K 1/145; C07K 1/30; C07K 14/415; C07K 14/426; B02B 1/00; B02B 1/02; B02B 1/04; B02B 3/00; B02B 3/14; B07B 4/00; B07B 7/00; B07B 7/01; B07B 7/02; B07B 7/08; B07B 7/10; B07B 11/06; B07B 13/04; B07B 13/05; B07B 13/14; B07B 13/16; B03B 1/00; B03B 1/02; B03B 1/04; B03B 5/48; B03B 7/00; B03B 9/00; A23V 2250/548; A23V 2300/31; A23V 2300/14; A23V 2300/38; A23V 2002/00; A23V 2300/10

USPC .... 210/173, 195.1, 202, 205, 206, 259, 260, 210/512.1, 513, 634, 702, 712, 723, 724, 210/787, 770, 774, 804, 805, 806; 99/485, 495, 509–513, 516, 518, 540, 99/542, 544, 584, 646, 646 R, 646 LS; 241/6–12, 38; 426/622, 629, 634, 656, 426/425, 429, 443, 465, 472, 481, 482, 426/484; 554/9, 12–14, 31, 175; 209/20, 209/21, 133, 142, 712

See application file for complete search history.

(56) References Cited

U.S. PATENT DOCUMENTS

| | | | | |
|---|---|---|---|---|
| 2002/0193617 | A1* | 12/2002 | Ulrich | A23D 9/00 554/12 |
| 2003/0083512 | A1* | 5/2003 | Jakel | A23D 9/00 554/10 |
| 2003/0224496 | A1* | 12/2003 | Jakel | A23D 9/00 435/144 |
| 2004/0077838 | A1* | 4/2004 | Green | A23J 1/14 530/370 |
| 2008/0260902 | A1* | 10/2008 | Van Houten | A23D 9/00 426/18 |
| 2009/0286961 | A1* | 11/2009 | Tang | A23J 1/14 530/378 |
| 2010/0281765 | A1* | 11/2010 | Schwartz | A23J 1/14 44/451 |
| 2012/0021457 | A1* | 1/2012 | Tang | A23J 1/006 435/68.1 |
| 2013/0251857 | A1* | 9/2013 | Mitobe | A23L 33/105 426/93 |
| 2014/0030421 | A1* | 1/2014 | Markedal | A23J 1/14 426/634 |
| 2015/0305361 | A1* | 10/2015 | Holz-Schietinger | A23C 20/02 426/62 |
| 2017/0318834 | A1* | 11/2017 | Wnukowski | A23J 3/14 |

* cited by examiner

METHOD AND SYSTEM FOR REMOVING ANTI-NUTRITIONALS FROM A FEED STOCK

RELATED APPLICATIONS

The present application relates to and claims priority to U.S. Provisional Patent No. 62/453,151 entitled "PLANT PROTEIN EXTRACTION WITH VICINE/COVICINE REMOVAL" filed Feb. 1, 2017. The present application also is a continuation-in-part, relating to and claiming priority to U.S. patent application Ser. No. 15/014,882 entitled "DRY FRACTIONATION FOR PLANT BASED PROTEIN EXTRACTION" filed Feb. 3, 2016, which is a continuation-in-part of and claims priority to U.S. patent application Ser. No. 14/997,744 entitled "ETHANOL DE-OILING FOR PLANT BASED PROTEIN EXTRACTION" filed Jan. 18, 2016, which is a continuation-in-part of and claims priority to U.S. patent application Ser. No. 14/694,341 entitled "PLANT BASED PROTEIN EXTRACTION METHOD AND SYSTEM" filed Apr. 23, 2015.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The disclosed technology relates generally to processing plant-based food items for the extraction of protein and more specifically to a commercial method and system for protein extraction including the removal or de-activation or substantial reduction of anti-nutritionals, such as vicine and covicine.

BACKGROUND

There are known protein extraction techniques, including techniques described in the related applications. While protein extraction techniques allow for the acquisition of plant-based protein and refinement of the protein as a viable protein source for mass consumption, the current techniques are limited when the protein source has anti-nutritional components. For many of these protein sources, when generating protein extraction, the extracted protein retains many of these anti-nutritionals. Existing protein extraction techniques fail to account for the anti-nutritional components in the final product, reducing the benefit or even usability of the protein.

A prime example of such anti-nutritionals are vicine and covicine found in fava beans. Fava beans, (*Vicia faba* L) also referred to as broad beans and fava beans, among other nomenclatures, naturally include the chemical compounds of vicine and covicine along with other anti-nutritionals. While fava beans are globally prevalent as a natural food and protein source, the effectiveness of the fava bean is inherently limited. Favism is a disease that impacts certain people who consume fava beans or other legumes, where these individuals are deficient in the enzyme Glucose-6-Phosphate Dehydrogenase (G6PD) and are unable to prevent the glycosides, vicine and covicine, from oxidizing to Divicine and Isouramil, respectively.

There are approximately 100 million G6PD deficient individuals in the world, largely concentrated in the Mediterranean, East Asian and North African regions. Therefore, there is a significant barrier to entry for developing and utilizing fava bean for both human and animal consumption due to the presence of vicine and covicine.

The problems associated with plant-based protein sources having anti-nutritional factors are compounded when the protein source is air-classified to a protein concentrate. Compounds impacting taste and health are then generally associated with the lighter protein fraction, thus limiting protein concentrate usefulness. In the example of vicine and covicine, air classification separations are also only partial separations of these anti-nutritional elements, and thus vicine/covicine are still present in the starch and flour fraction.

Prior techniques to overcome anti-nutritional elements include attempts to genetically modify the plant source for breeding out the anti-nutritionals. After many years low tannin fava bean lines exist. This technique is problematic for multiple reasons, including the time and effort required to modify and then generate a commercially consumable crop with regional adaptations for various crop types and specific anti-nutritional factor. There may also be unidentified and unintended consequences of genetically modifying agricultural crops. Moreover, there is a current trend in consumer behavior to avoid genetically modified food sources.

As known in the art, other techniques for specific vicine/covicine removal include cooking techniques, steaming, acid washes, and/or chemical treatments. These techniques are not commercially scalable and have not been proven effective for the complete removal of vicine/covicine.

In addition to the anti-nutritional factors preserved for the end user, nutritional limitations affecting bio-availability of the plant-based proteins have not been addressed by current processing techniques.

Plant-based proteins are often characterized as being inferior to animal proteins due to the limited quantities of sulfur containing amino acids, which are more prevalent in animal tissue. In the interest of providing guidance and scale for protein quality, standards have been developed to grade protein and amino acid quality for the human diet. One such standard is the Protein Digestibility Corrected Amino Acid Score (PDCAAS). Another standard is the Protein Efficiency Ratio (PER). Other standards include Biological Value (BV) and ileal digestibility.

PDCAAS, which is an industry commercial grading standard used by food and nutrition companies assesses the percentage of the limiting amino acid on a sample to a reference while multiplying by digestibility. Typical industrial processes are unable to improve upon the digestibility of a protein in its native form. Therefore, plant-based PDCAAS scores typically fall short of those calculated from animal-based proteins.

Industry and academia subject matter experts have focused on the sourcing and breeding for higher nutritional values, including amino acid content and protein value. Customers in the food and beverage industry are frequently looking to leverage validated, value-added nutrient content claims from unique plant-based nutritional ingredients. To date, those customers are forced to invest in multi-source nutritional blends or rely upon soy-based proteins to satisfy an enhanced amino acid (PDCAAS) of complete protein claim.

Therefore, there exists a need for method and process to improve nutritional aspects and provide nutritional enhancements to plant-based protein extracted therefrom.

DESCRIPTION OF THE INVENTION

The present invention provides for extraction of protein and increased nutritional profile from plant-based protein sources by combination of reduced anti-nutritional factors and greater bio-availability of the proteins. In one embodiment, the present invention performs protein extraction using one or more embodiments of the protein extraction technique(s) described in the related applications. The present invention further provides for the removal of anti-nutritionals as well as nutritional enhancements complimentary to the protein extraction process.

The method and system includes generating a feed stock from a plant-based protein source, where the plant-based protein source has anti-nutritionals disposed therein. The method and system therein generates an ethanol slurry by combining the feed stock with an ethanol wash containing a first volume of ethanol. The method and system processes the ethanol slurry through an extractor to generate an ethanol matrix and a feed stock mass. The method and system provides the feed stock mass to a desolventizer to generate a desolventized feed stock mass. Therein, the method and system dries the desolventized feed stock mass, generating a clean feed stock having at least a portion of the anti-nutritionals removed therefrom.

While described herein in the embodiment of fava beans, the present technique is applicable to any bean, pea or grain legume or protein source. having anti-nutritionals therein. Moreover, the herein described embodiment refers to the removal of vicine/covicine as anti-nutritionals, such embodiments are not limiting in nature and the removal technique is applicable for the removal of many anti-nutritionals using a solvent. In one embodiment using ethanol, the action of an anhydrous ethanol wash disrupts H-bonding such that compounds are de-activated, partially cleaved or destroyed, otherwise dissolved and removed or substantially reduced in amount or effect in the result products (Dehydration, elimination of sulfhydrols). Furthermore, the described enhancements include the enhancing of characteristics of the protein, as well as the removal organics and/or inorganics that provide enhancements based on removal.

The present technique is further operative for the removal or reduction of other anti-nutritionals, such as but not limited to, non-protein amino acids, alkaloids, glycosides, isoflavones, tannins, oligosaccharides, phytic acid, saponins, polyphenols, protease inhibitors, α-amylase inhibitors, trypsin inhibitors and lectins.

In general, the enhanced nutritional value technique includes the flaking or milling the food source and then combining in an anhydrous ethanol wash. In additional embodiments, the chemical make-up or structure of the anti-nutritional may be disrupted and/or changed, ceasing to exist and thus eliminating the need for the express removal of the specific anti-nutritional. The mass is desolventized and dried to produce the dry flakes, or meal or flour having the anti-nutritionals removed or de-activated. The ethanol matrix is further processed to extract the anti-nutritionals using physical or chemical separation procedures like an acid wash and/or base wash, and ethanol recovery through evaporation and condensation.

RELATED APPLICATION

A better understanding of the disclosed technology will be obtained from the following detailed description of the preferred embodiments taken in conjunction with the drawings and the attached claims.

DETAILED DESCRIPTION

Figure 1:
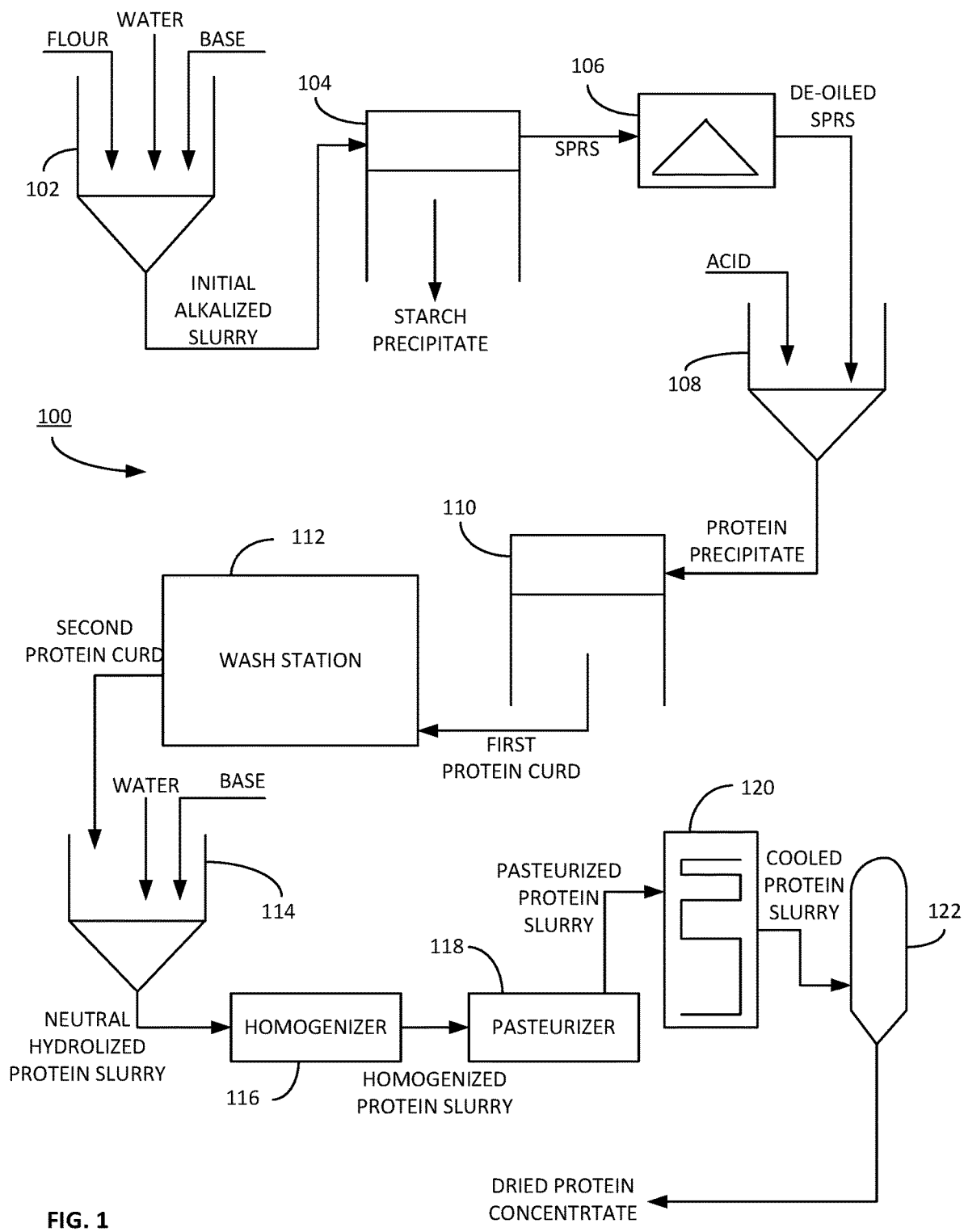
FIG. 1 illustrates a block diagram of one embodiment of a system for generating chickpea protein concentrate.

FIG. 1 illustrates a system 100 including a first mixer 102, a first separator 104, a second separator 106 and a second mixer 108. The system further includes a third separator 110, a wash station 112, a third mixer 114, a homogenizer 116, a pasteurizer 118, a vacuum evaporator 120 and a dryer 122.

FIG. 1 illustrates one embodiment of a process flow operation for generating the chickpea concentrate as described herein. In this embodiment, the process described herein makes the product of a chickpea concentrate.

The first mixer 102 receives flour, water and a base. In one embodiment, the flour is chickpea flour, but it is recognized that other suitable types of flour may be utilized. In this step, via the mixer, the flour is hydrated and there is a pH shift to solubilize the protein a solid-liquid extraction.

It is within the scope of the present invention that varying types of chickpea flour or the protein-based input ingredient(s) may be utilized, where the process described herein may be modified to account for such variations in the mixer 102 input. For example, the chick-pea flour may be a de-oiled flour, such that further processing operations described below for performing de-oiling operations may be omitted. For example, the flour may be pre-treated with a hexane extraction process, or other process to modify or adjust the physical composition of the flour, for example, as described in further detail in FIGS. 8-10 below.

In one embodiment, in the mixer 102, hydration of the flour includes water ratio ranges between 5-12:1 depending on equipment and desired purity of end product. While varying ranges may be utilized, this embodiment includes a low-end ratio is found to be 4:1, with a high-end ratio dependent upon capacity of drying operations noted below. In one embodiment, operational temperature range is between 4-60 C depending on embodiment of final product attribute, including generating a pH between 8-11. The mixer 102, in this embodiment, operates using low shear conditions. Similarly, this embodiment uses a reaction time between 30-60 min depending on holding conditions.

It is noted that the above ranges and conditions, as well as ranges, conditions and values noted within the present specification, are exemplary in nature of the various embodiments. The ranges and conditions are not limiting of the disclosed invention, wherein operations aspects outside the noted ranges may be utilized in the protein extraction process, as recognized by one skilled in the art.

Based on the mixing operations, the mixer outputs an initial alkalized slurry. The initial alkalized slurry is then transported to the first separator 104. As described in further detail below, the initial alkalized slurry may be transported using a low sheer pump, but it is recognized that any suitable pump may be utilized.

The first separator 104 separates the initial alkalized slurry into a starch precipitate and a solubilized protein rich steam. The separator 104, in one embodiment, is a decanter centrifuge. The starch precipitate is extracted and in one embodiment can be discarded. The solubilized protein rich stream is further processed to a second separator 106.

In one embodiment, solubilized protein rich stream may be transferred to the separator 106 using a low-sheer pump, but any other suitable pump may be utilized.

The solubilized protein rich stream is separated using, in one embodiment, with the separator 106 being a disk-stack centrifuge to remove cream fraction. The centrifuge output includes a concentrated oil cream and a de-oiled solubilized protein rich stream. The concentrated oil cream may be discarded or otherwise processed.

In one embodiment, separator 110, wash station 112 and mixer 114 may be omitted from the process flow, whereby the de-oiled protein rich stream can be passed through filters to extract functional proteins. It is recognized that other processing or extraction steps may be utilized aside from the examples noted herein. Wherein, the extracted proteins are then subject to further processing steps described herein.

Whereas, the present processing system therein transfers the de-oiled solubilized protein rich stream to a second mixer 108. An acid is additionally added into the second mixer 108.

Within the second mixer 108, the combination of de-oiled solubilized protein rich stream and the acid generates a protein precipitate. In this second mixer tank 108, acid is added to iso-electrically precipitate the protein. In one embodiment, temperature ranges between 20-75 C depending on the yield of protein extracted in the separation step using the first separator. The lower the temperature, the more native the protein will stay and the higher acid soluble loss. At high temps, higher yields and loss of some functionality will occur. One embodiment provides for pH level to be between 4.0-4.8 depending on temperature profile. Within the second mixer 108, in this embodiment, agitation level is low to promote flocculation. The acid type can be dependent on equipment and desired end functionality of protein.

The combination in the second mixer 108 generates the protein precipitate composed of a serum and an acid curd. The protein precipitate is provided to a third separator 110. In one embodiment, the protein precipitate is fed by a low-shear pump to the third separator 110, being a decanter centrifuge, to separate the serum from the acid curd. The serum protein is extracted, leaving a first protein curd transferred to the wash station 112.

Within the wash station 112, water is added to acid curd to rehydrate the mixture. The water is added via a water mixer to generate acid curd slurry. The wash station further includes wash separator that is, in one embodiment, fed by low-shear pump to the decanter centrifuge to separate the serum from the acid curd. The wash separator therein generates a second protein curd. Further embodiments of the wash station are described relative to FIGS. 2-3 below.

Once the process completes one or more washing operations, a third mixer 114 receives the protein curd output, as well as a base, water and an enzymatic cocktail (protease). In one embodiment, within the mixer 114, the protein curd is hydrated between 90 and 70% moisture. The protein curd is step-wise neutralized to a final pH of 6.5-7.5. Varying step-wise pH adjustments, temperature, and hold times for the mixer are specific to optimal enzymatic reactivity.

In one embodiment, for desired native proteins in the final product, the enzymes are not added.

The third mixer 114 output is a neutral hydrolyzed protein slurry. A high pressure homogenizer 116 receives the slurry such that high pressure homogenization provides for texture, particle size control, and homogenization of the slurry.

The high pressure homogenizer 116 generates an output of a homogenized protein slurry. This homogenized protein slurry is then pasteurized using the pasteurizer 118. In one embodiment, the pasteurizer performs pasteurization at a minimum temperature of 60 C, having a hold time that is dependent on pasteurizing temperature.

The pasteurization, via the pasteurizer 118, generates a pasteurized protein slurry. This slurry is fed into the vacuum evaporator 120. In one embodiment, the vacuum evaporator's pressure, temperature and flow rate are dependent on the pasteurization setup of the pasteurizer. For example, in one embodiment having a high temperature (e.g., 240 F), the vacuum evaporator may include a 2 second hold time with direct steam injection at a −0.5 bar pressure, with a 20 second hold time w/deltaT to 130 degrees at half bar.

Water is removed using the vacuum evaporator 120, producing an output of a cooled protein slurry. The vacuum evaporator 120 can operate in various embodiments based on the desired properties of the cooled protein slurry. For example, one embodiment may include higher order processing operations to remove aromatics attendant in the pasteurized protein slurry. In this example, if the final protein concentrate is usable for food supplements having taste parameters, the removal of the aromatics, also referred to as the volatiles, helps eliminate any subsequent aftertaste from the protein consumption. In other embodiments where the protein supplement may undergo further processing or combined in a manner where aromatics are not problematic, a less efficient operation of the vacuum evaporator 120.

In one embodiment the cooled protein slurry may include volatile elements based on the vacuum evaporation process not removing native aromatics. In another embodiment, the cooled protein may not include these volatile elements, as the elements are removed in the vacuum evaporation process.

The cooled protein slurry is fed into the dryer 122. The dryer 122 performs drying operations to generate a dried protein concentrate. Different embodiments of dryer types and feed temperatures are dependent on one or more factors, including: pasteurization operations; evaporator conditions; hydration level of neutralized protein slurry; and characteristics necessary to consumer application i.e bulk density, moisture level, particle size, and agglomeration.

Therein, the dryer 122 generates the dried protein concentrate originated from the flour, water and base originated in the first mixer 102.

Figure 7A:
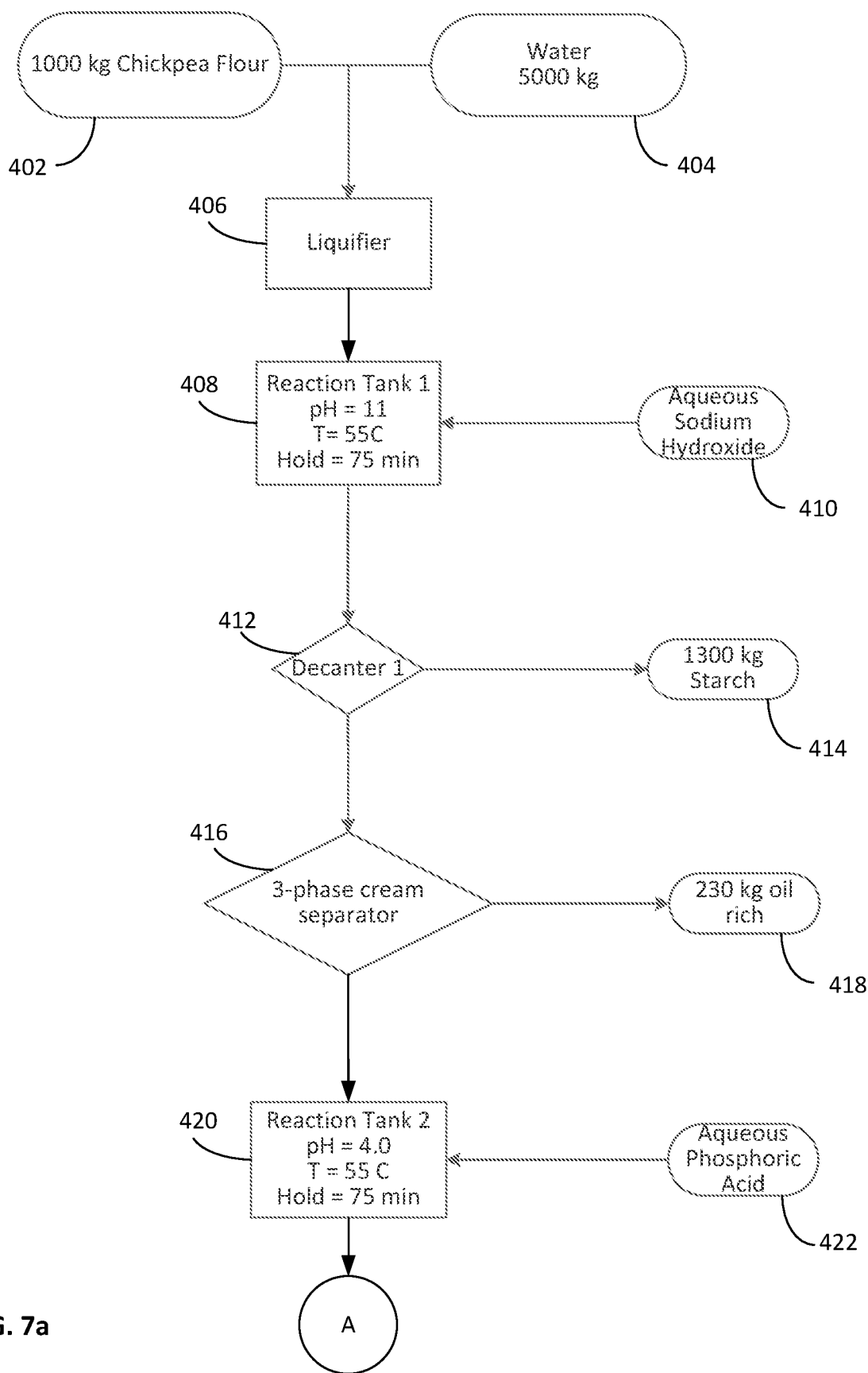
FIGS. 7a and 7b illustrate one exemplary embodiment of a system for generating chickpea protein concentrate.
Figure 7B:
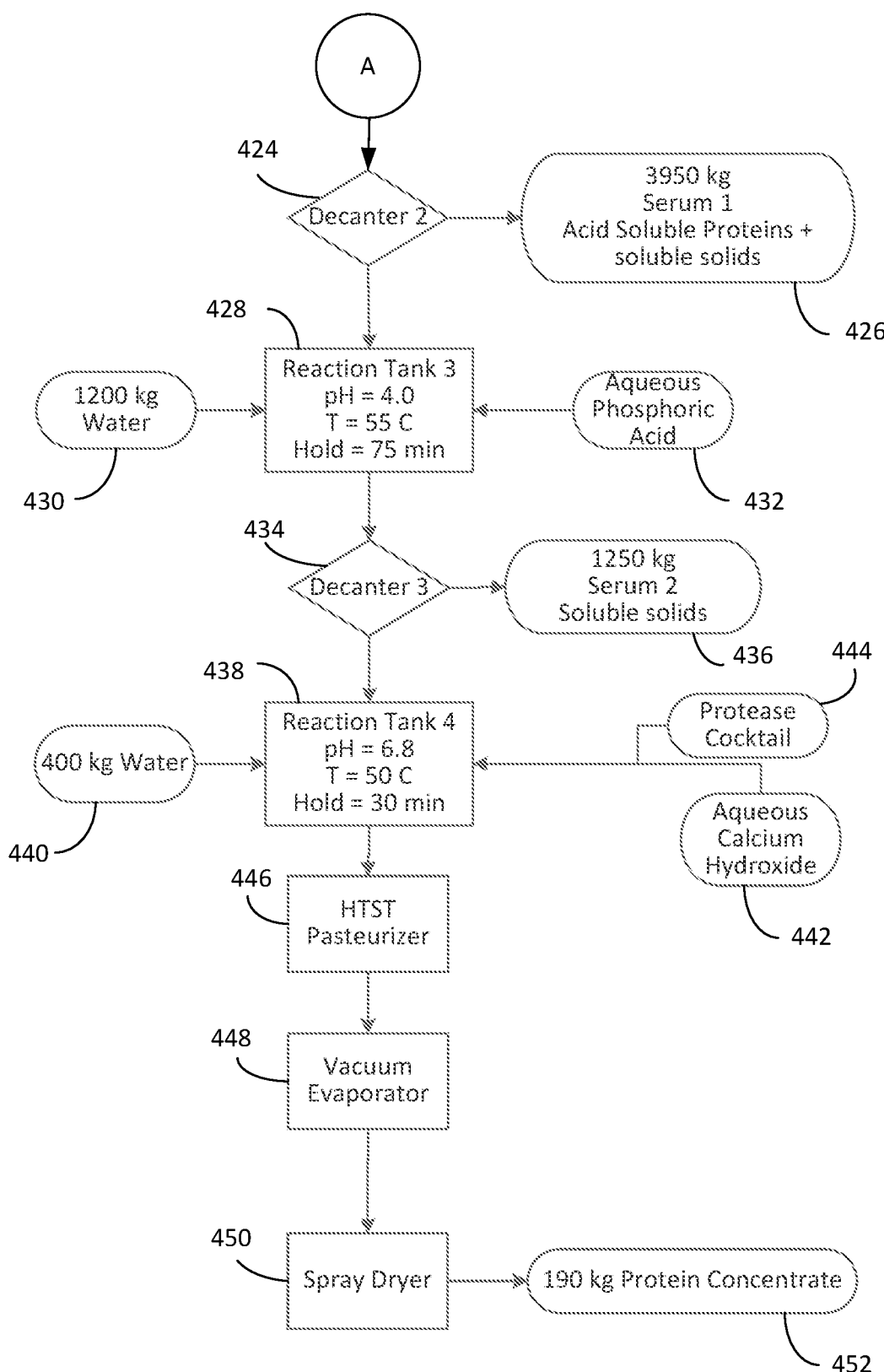

As described in further detail below, FIGS. 7*a* and 7*b* illustrate one specific exemplary embodiment of chickpea protein generation using noted operational values.

Figure 2:
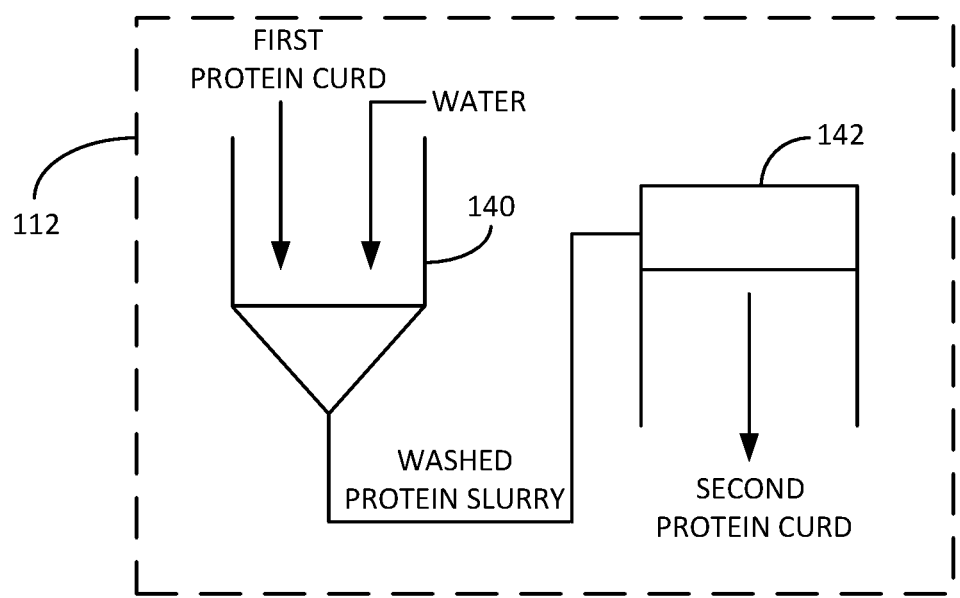
FIG. 2 illustrates one embodiment of a wash station of the system of FIG. 1.

FIG. 2 illustrates one embodiment of wash station 112 of FIG. 1. In this embodiment, the wash station 112 includes a wash mixer 140 and a wash separator 142. Within the wash station, water is added to acid curd to rehydrate the mixture. The water is added via the water mixer 142 to generate the acid curd slurry. In one embodiment, slurry moisture can range from 98-75% depending on equipment and purity of final product and pH can range between 4.0 and 4.8 depending on temperature profile. In one embodiment, the temperature can range between 20-75 C depending on previous precipitation condition, desired degree of denaturation, yield, and desired purity of the protein concentrate. In the water mixer 140, agitation is low to further promote flocculation.

The wash station 112 further includes the wash separator 142 that is, in one embodiment, fed by low-shear pump to the decanter centrifuge to separate the serum from the acid curd. The wash separator therein generates the second protein curd.

In different embodiments, the operations of the wash station may be iterated for further purity of the protein curd. For example, one technique may include a second wash station with the protein curd rehydrated and then fed by low-shear pump to another decanter centrifuge to further separate serum.

Figure 3:
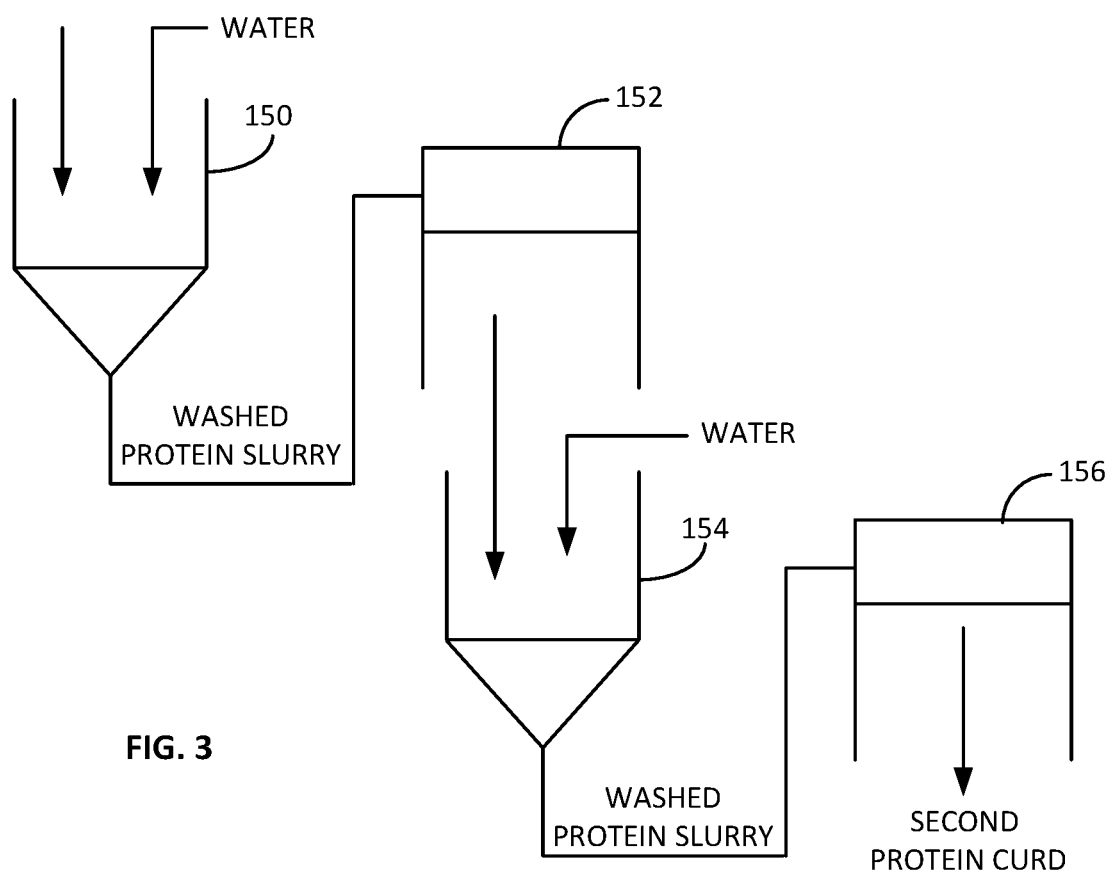
FIG. 3 illustrates another embodiment of a wash station of the system of FIG. 1

FIG. 3 illustrates one embodiment of a wash station have multiple wash mixers 150, 154 and multiple wash separators 152, 156. As illustrated, the output of the first wash separator 152 is fed directly into a second wash mixer 154. The second wash mixer combines the separator 152 output with water, generating the washed protein slurry. This slurry is fed into the second wash separator 156 to generate the second protein curd.

FIG. 2 illustrates the wash station 112 having a single mixing/separating stage, whereas FIG. 3 illustrates multiple mixing/separating stages. It is recognized that the wash station 112 may include any number of mixing and separating stages, providing higher degree of second protein slurry clarity consistent with operational guidelines, operational efficiency and desired quality of the protein concentrate extracted from the dryer 122 of FIG. 1.

Figure 4:
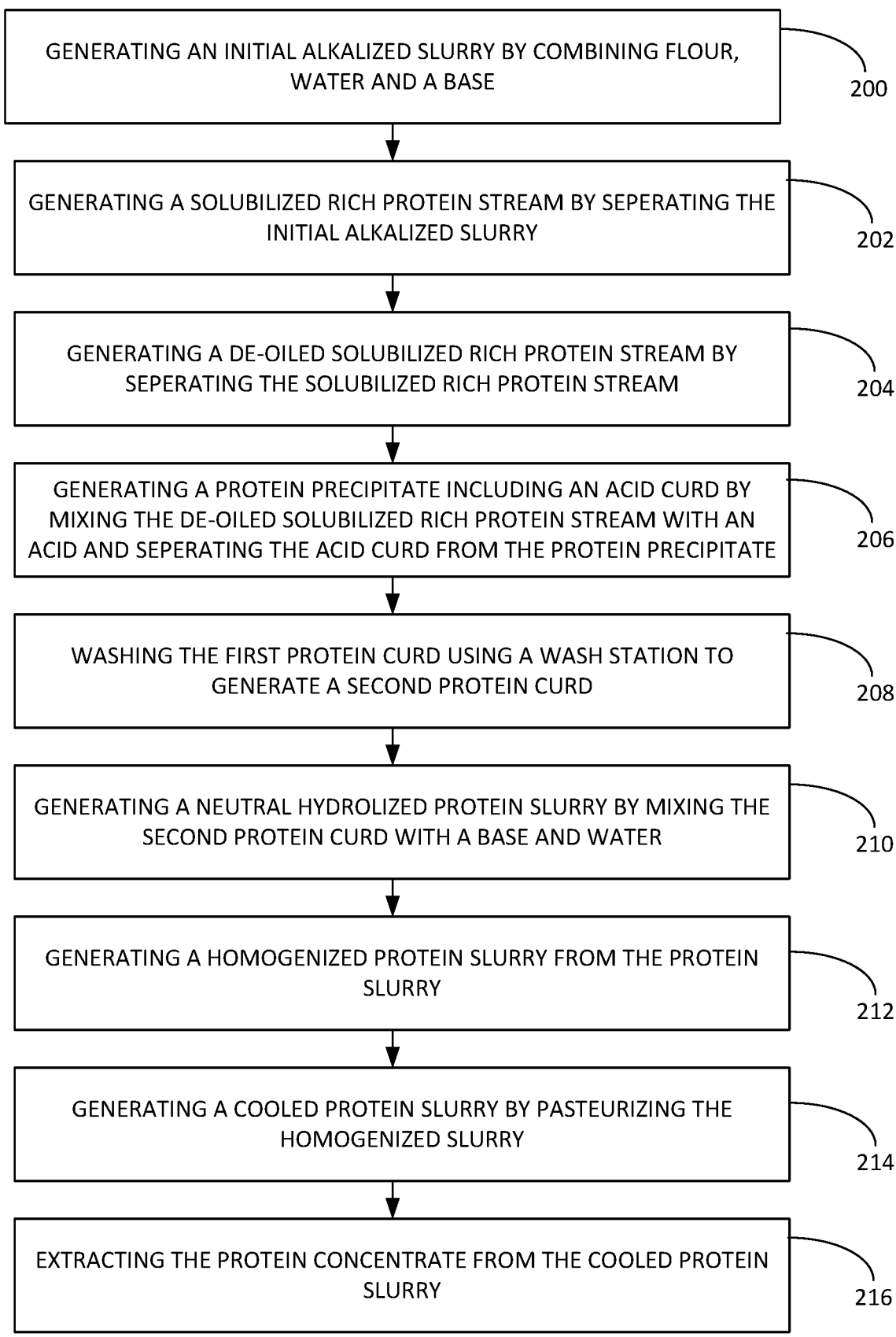
FIG. 4 illustrates a flowchart of one embodiment of a method for generating chickpea concentrate.

FIG. 4 illustrates one embodiment of a flowchart of steps of a method for generating a chickpea concentrate. The method described herein may be performed using the system 100 of FIG. 1, whereas it is recognized that the steps may be performed using any other suitable machine or apparatus for performing the described operation.

A first step, step 200, is generating an initial alkalized slurry by combining flour, water and base. As described above, the flour is a chickpea based flour.

In one embodiment, instead of chickpea flow feed stock, wet-milled while chickpeas can be used and fed directly to the wet process. In another embodiment, an air classified protein concentrate can be used. It is recognized that various other embodiments exist such that based on preceding processing conditions, a chickpea flour-type input in some manner or another, is fed into the system.

A next step, step 202, is generating a solubilized rich protein stream by separating the initial alkalized slurry. This step may be performed using a separator, wherein in one embodiment the step includes the removal of a starch precipitate from the slurry.

A next step, 204, is generating a de-oiled solubilized rich protein stream by separating the solubilized rich protein stream. This step may be performing using a separator, including generating a concentrated oil cream as well as the de-oiled solubilized rich protein stream.

A next step, step 206, generating a protein precipitate including an acid curd by mixing the de-oiled solubilized rich protein stream with an acid and separating the acid curd from the protein precipitate. This step may be performed using the second mixer 108 as described above.

A next step, step 208, is washing the first protein curd using a wash station to generate a second protein curd. As described in further detail below, this step may include iterative washing operations, generating the second protein curd.

A next step, step 210, is generating a neutral hydrolyzed protein slurry by mixing the second protein curd with a base and water. This step may be performed using the third mixer of FIG. 1 above.

A next step, step 212, is generating a homogenized protein slurry from the protein slurry. The homogenization may be performed using a high pressure homogenizer as described above.

Therefrom, step 214, is generating a cooled protein slurry by pasteurizing the homogenized slurry. The protein slurry may be cooled using a vacuum evaporator, similar to the evaporator 120 of FIG. 1 with operations conditions as described above.

In various embodiments, the cooling of the protein slurry can be performed to varying degrees generating varying quality levels of cooled protein slurry. Using a higher order of evaporating, undesired aromatics may be extracted from the protein slurry.

Step 216 is extracting the protein concentrate from the cooled protein slurry. This step may be performed using a dryer performing drying operations, extracting water as the byproduct of the drying process. Therein, in this embodiment, the method provides the extracting of protein concentrate from chickpea flour.

Figure 5:
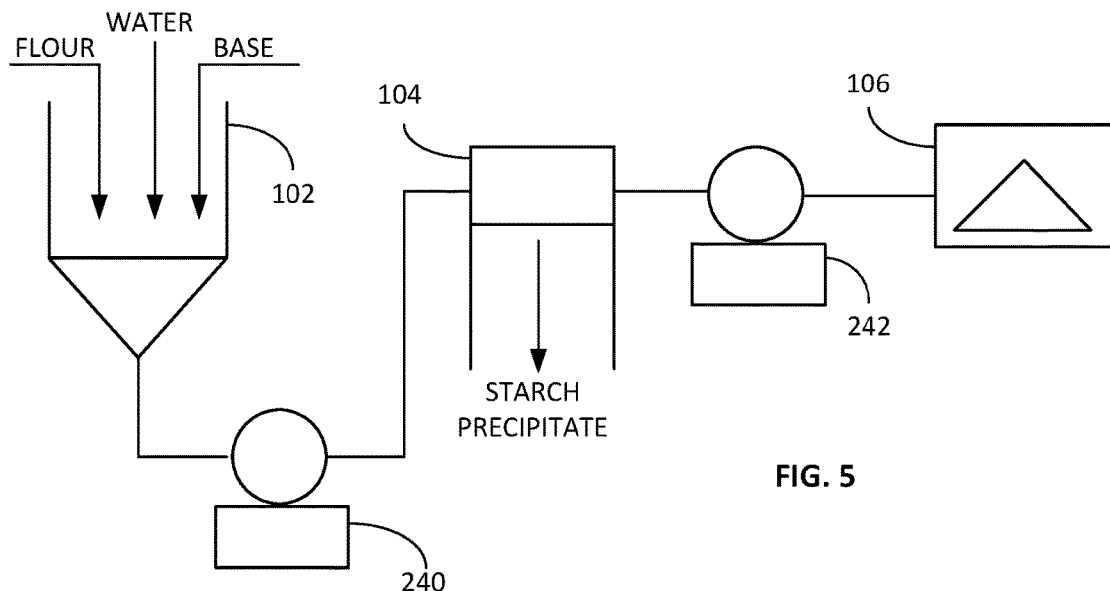
FIG. 5 illustrates another embodiment of a portion of the system for generating chickpea protein concentrate of FIG. 1.

FIG. 5 illustrates one embodiment of a portion of the system of FIG. 1. The illustrated embodiment of FIG. 5 includes the first mixer 102, the first separator 104 and the second separator 106. Whereas, in this embodiment, the outputs from the first mixer 102 is transferred to the first separator using a low sheer pump 240. Similarly, the output of the first separator 104 is transferred to the second separator 106 using a low sheer pump 242. In one embodiment, a positive displacement pump can be used to achieve low shear conditions. An example of this pump is the Waukesha Universal II Pump, Model 130-U2 available from Waukesha Cherry-Burrell in Delavan Wis.

Figure 6:
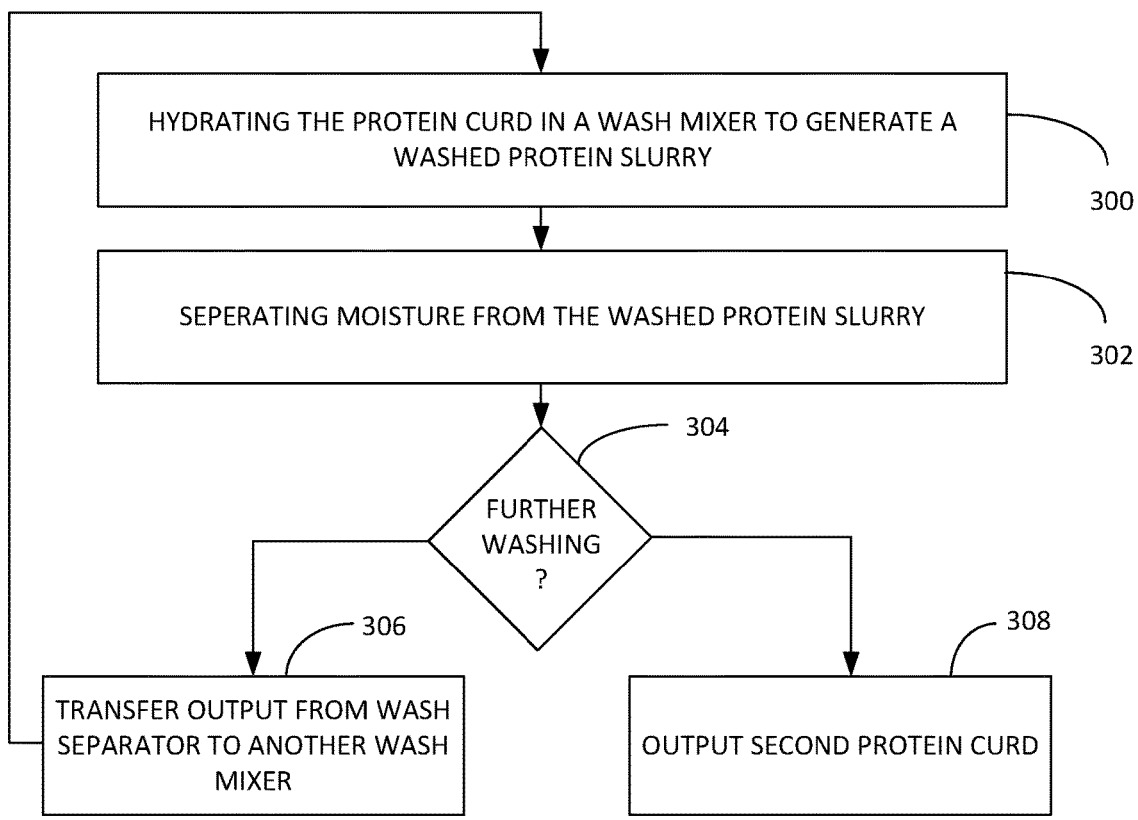
FIG. 6 illustrates steps of embodiment of the method for generating chickpea protein concentrate.

FIG. 6 illustrates a flowchart of one embodiment of further operations of the wash step 208 of FIG. 4. The steps of FIG. 6 may be performed using the elements of FIG. 2 or FIG. 3 described above.

A first step, step 300, is hydrating the protein curd in a wash mixer to generate a washed protein slurry. A next step, step 302, is separating the moisture from the washed protein slurry. In the methodology of FIG. 6, a determination is made if there are further washing iterations, step 304.

In the event further washings are requested or required, step 306 is transferring the output of the wash mixer from the wash separator into another wash mixer. Thereupon, the method re-iterates to step 300. In the event the determination of step 304 is that no further washing is requested or required, the method reverts to step 308, outputting the second protein curd. Therefore, the methodology allows for the iterative washing of the protein curd, if desired.

FIGS. 7a and 7b illustrate a processing flowchart of one exemplary embodiment of a chickpea protein extraction process. While noted with exemplary values, the embodiment of FIGS. 7a and 7b, including the exemplary values, are not limiting in nature as varying processing values may be readily utilized, as recognized by one skilled in the art.

The process begins in FIG. 7a, wherein 1000 kg Chickpea flour 402 is liquefied with 5000 kg water 404 using a liquefier 406. The combined slurry enters a first reaction tank 408 in which the pH is adjusted to 11 using aqueous sodium hydroxide 410, temperature at 55 C and held under low shear conditions for approximately 75 minutes. Using the first decanter 412, approximately 1300 kg of wet starch 414 is then extracted and the protein rich liquid is passed through a 3-phase cream separator 416. This cream separator extracts approximately 230 kg of concentrated oil 418.

The de-oiled protein stream from the 3-phase cream separator 416 then passes into a second reaction tank 420, in which the pH is adjusted to 4.0 using aqueous phosphoric acid 422, temperature at 55 C, and held approximately 75 minutes. From the second decanter 420, 3950 kg aqueous sugars and acid soluble proteins 426 are removed to the light phase. From the second decanter 420, the protein curd is then provided to a third reaction tank 420, rehydrated to 10% dry solids with 1200 kg water 430 at 55 C. If necessary, the pH is adjusted back to 4.0 using aqueous phosphoric acid 432 and held for approximately 75 minutes.

The rehydrated protein rich slurry is then passed through a third decanter 434, removing approximately 1250 kg of serum 2 consisting of primarily aqueous sugars 436. A fourth reaction tank 438 receives the second acid curd from the third decanter 434, combines with 400 kg of water at 50 C 440, to achieve a 15% dry solid mixture. The pH is adjusted to approximately 6.8 using calcium hydroxide 442 and then a protease cocktail 444 is added to cleave the proteins for end application.

In this embodiment, the enzymatic reaction is allowed to take place for approximately 30 min under low shear conditions and fed to a High Temperature/Short Time pasteurizer 446 to kill any microbial and terminate the enzymatic reaction.

The slurry is then fed to a vacuum evaporator 448 to increase the solids level. The output of the evaporator 448 is then spray dried using spray dryer 450. Wherein, in this embodiment, the process obtains 190 kg of a hydrolyzed protein concentrate 452 at minimum 80% protein.

Figure 8:
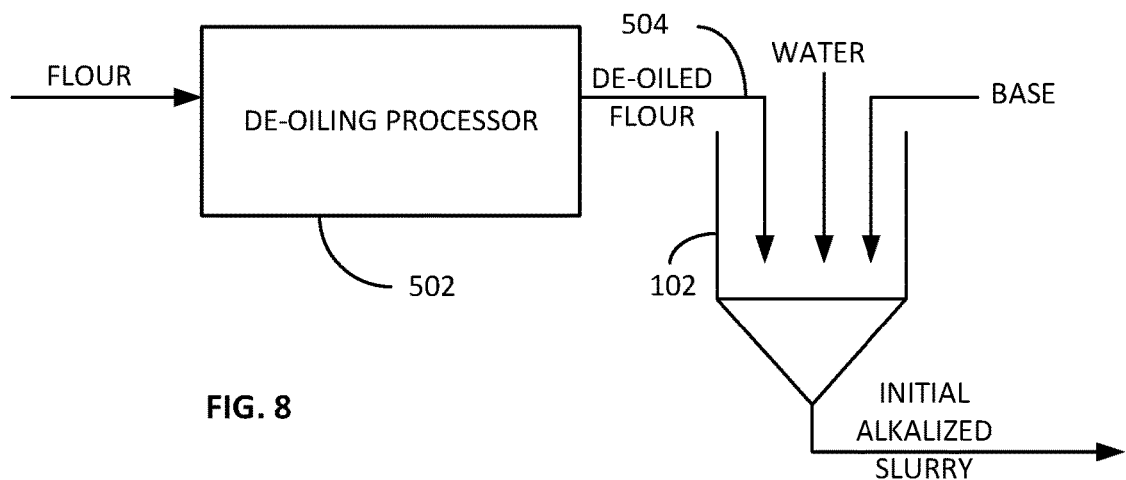
FIG. 8 illustrates a block diagram of a de-oiling processor prior to protein extraction.

FIG. 8 illustrates one embodiment of another technique for generating plant-based protein extraction by de-oiling the material prior to the protein extraction process. The elements of FIG. 8 provide for pre-processing of the flour, as illustrated in FIG. 1, but include the removal of oil, sugars and other organics within the flour.

Figure 9:
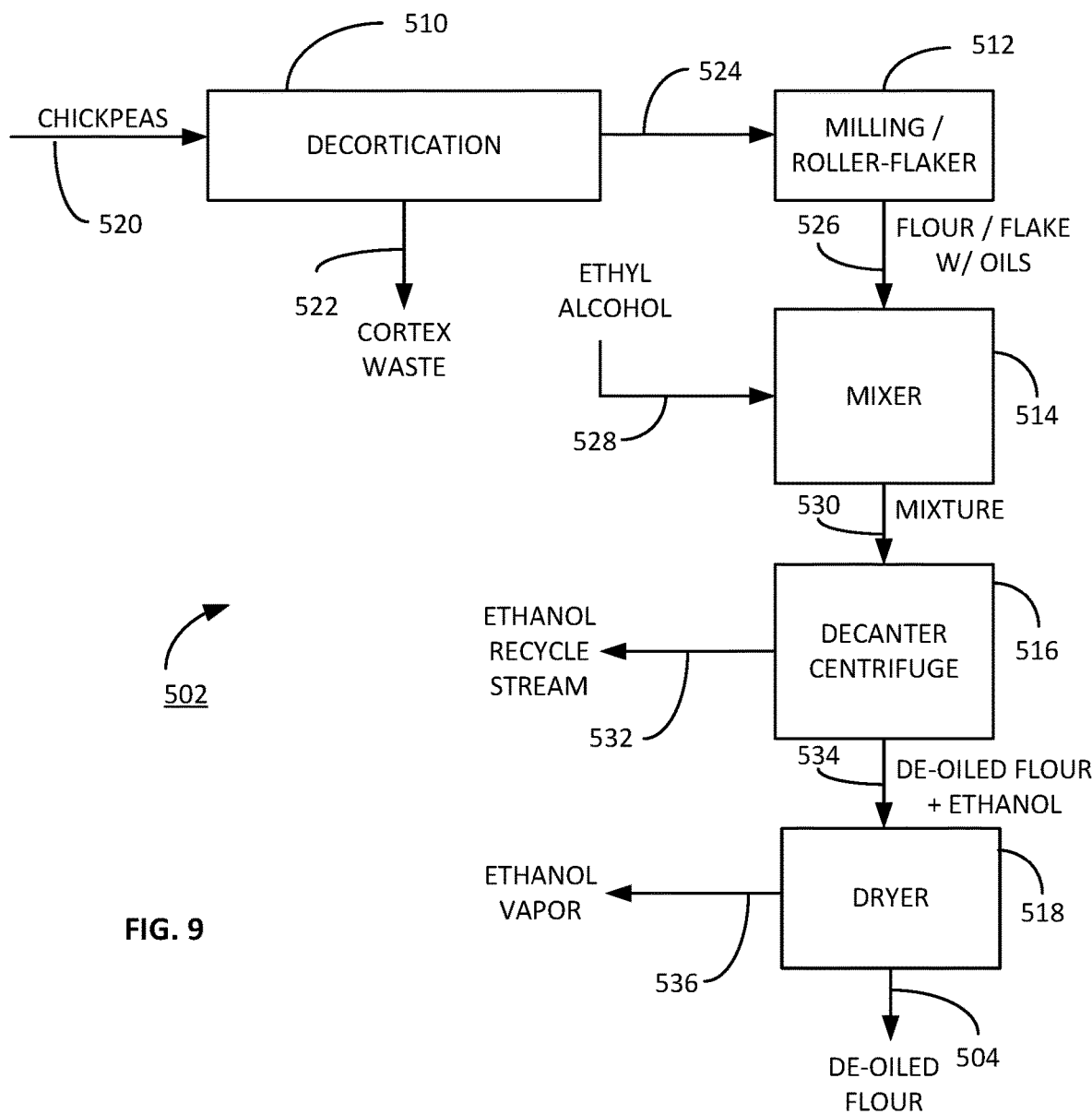
FIG. 9 illustrates a block diagram of one embodiment of a de-oiling processor.

The embodiment of FIG. 8 includes a de-oiling processor 502, as described in further detail in FIG. 9. The de-oiling processor receives the food element from which the protein is extracted. In the exemplary embodiments of FIGS. 8 and 9, the food source is chickpeas, but as noted herein, any other suitable type of food source may be utilized. Via the de-oiling process, the processor 502 generates de-oiled flour 504.

Similar to the process of FIG. 1, the de-oiled flour is therein provided to the mixer 102, along with water and a base to generate the initial alkalized slurry. Where the de-oiling processor 502 includes a flour mill, the de-oiled flour 504 may be the same flour input as noted in FIG. 1. If the processor 502 uses a roller mill/flaker, additional milling may be required to convert the flakes to a powder format usable as a direct input to the mixer 102.

With respect to the processing operation described above in FIG. 1, the inclusion of the de-oiling processor thereby modifies the FIG. 1 processes flow. Whereas in FIG. 1, the solubilized protein rich stream is fed to the separator 106 to remove a cream fractionation, this step is therefore extraneous. Rather, where the separator 106 de-oiled the solubilized protein rich stream, this stream is in this embodiment without oil. Thus, the solubilized protein rich stream is fed directly to the mixer 108 as illustrated in FIG. 1.

With respect to the above-noted operational aspects of the system of FIG. 1, these operational ratios and flow rates are based on a function of water solubility. The de-oiling process of the processor 502 therefore does not material change the operational ratios noted above and therefore in one embodiment the same operational ratios for the embodiment of FIG. 8 may be utilized in FIG. 1.

FIG. 9 illustrates one embodiment of the de-oiling processor 502 of FIG. 8. In the exemplary embodiment, the de-oiling is performed using a decortication device 510, a milling or roller-flaker 512, a mixer 514, decanter centrifuge 516 and a dryer 518.

The decortication device 510, mixer 514, decanter centrifuge 516 and dryer 518 may be any suitable device operative to perform the processing operations described herein, as recognized by one skilled in the art. The milling/roller-flaker 512 represents one of several varying embodiments operative within the present system. The device 512 may be a roller mill/flaker that is operative to process the decorticated chickpeas and generate flakes. The device 512 may, in another embodiment, be a flour mill operative to mill flour instead of flakes.

The decortication device 510 receives the chickpeas, which can be provided raw. The device 510 operates to remove the cortexes from the chickpea, removing the outer hull and exposing the protein-rich insides. The device 510 generates cortex waste 522, which can be discarded. The device 510 further outputs the chickpeas having the shells or cortexes removed to the milling/roller-flaker device 512.

The milling/roller-flaker device 512 operates to mill the chickpeas into a milled or flour feedstock. In one embodiment, instead of being milled to a particular powder, the device 512 may flake the chickpeas to a designated flake size, such as in one exemplary embodiment having flakes in the range of 0.25 mm to 0.4 mm, but such range is not limiting in nature. Whether the device 512 is a flaker or a miller, the output 526 still includes its oil. As noted herein, the flake ranges of 0.25 mm to 0.4 mm are exemplary ranges, but not express limiting ranges. It is recognized that smaller flake size may be utilized up until the flakes have a powder consistency. It is further recognized that larger flakes may be utilized where larger flakes may require further processing for efficient de-oiling.

As part of the de-oiling process, the mixer 514 therein mixes the flour 526 with ethyl alcohol 528, more commonly referred to as ethanol. The mixture of the ethanol with the flour provides for removal of the oil from the flour in accordance with known oil-extraction techniques. The mixer 514 may be an immersion or ethanol-wetting tank, which may include a mixing element to saturate the flour with ethanol. It is recognized that one embodiment uses pure ethanol herein, but other variations of ethanol may be utilized including ethanol mixed with other liquids, including have a water concentration or other mixture recognized by one skilled in the art, including for example ethanol recovered from a recycling loop as described below in FIG. 11.

The mixer 514 output is a mixture 530 of the flour and ethanol. The decanter centrifuge 516 receives the mixture 530 and therein extracts ethyl alcohol recycling stream 532, consistent of ethyl alcohol with oils, sugar and other organics absorbed therein. The extractor 516 additionally generates the de-oiled flour 534 with remaining ethanol. In this embodiment, the flour mixture 534 is a wet mixture, which is then provided to the dryer 518.

The desolventizing dryer 518 therein dries the flour mixture to remove final amounts of ethanol. A dryer output includes ethanol vapor 536, which can be collected and condensed for recirculation back to the mixer 528. The dryer also outputs the de-oiled flour 504, which is then made available to the mixer 102, as noted in FIG. 8 and FIG. 1.

Figure 10:
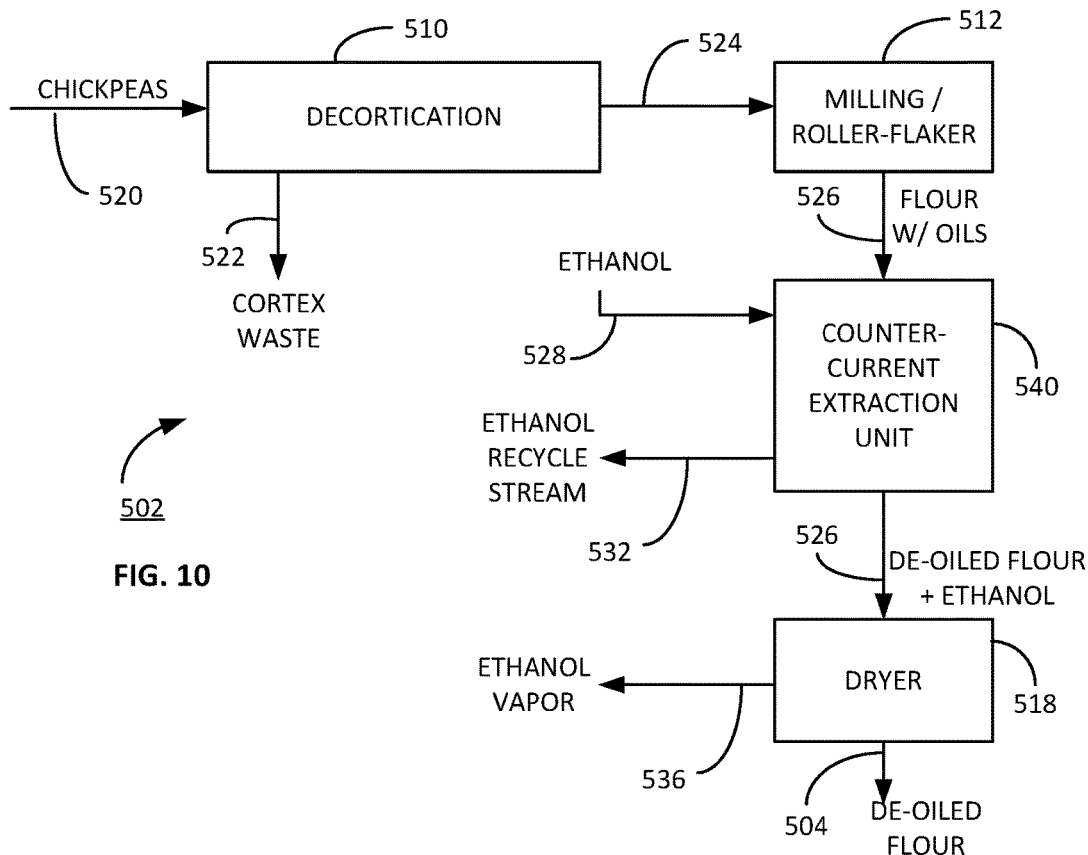
FIG. 10 illustrates a block diagram of another embodiment of a de-oiling processor.

FIG. 10 illustrates another embodiment of the de-oiling processor 502. This embodiment, includes the decortication device 510, milling/roller-flaker 512 and dryer 518, but instead uses a counter-current extraction unit 540. By way of example, the unit 540 may be a Crown Countercurrent solvent extraction unit, manufactured by Crown Ironworks, Roseville, Minn.

Similar to the operations of FIG. 9, the decortication device 510 generates waste 522, as well as the input to the milling/roller-flaker 512. Depending on whether the device 512 is a roller miller/flaker or a flour mill, the output is either flakes or flour, having oil contained therein.

In this embodiment, the counter-current extraction unit 540 receives the flake/flour plus oil mixture 526. Performing operations consistent with countercurrent extraction, the device 540 therein generates two outputs. Ethanol recycling stream 532 is the first output stream and de-oiled flour with ethanol 534 is the second stream. Therein the dryer 518 generates the ethanol vapor and de-oiled flour 504.

It is recognized that for embodiment of FIGS. 9 and 10, where the device 512 is a roller mill/flaker, the described flour includes flakes. These flakes are then further processed by a flour mill prior to insertion into the mixer 102 of FIGS. 1 and 8. Moreover, for ease of terminology, where described in FIGS. 9 and 10, describing flour after device 512, such description includes flakes relating to embodiments employing the flaker instead of the flour mill.

The dryer 518 of FIG. 9 and FIG. 10 may additionally include varying embodiments not expressly illustrated. For example, one dryer 518 type may be an air/nitrogen air-flow dryer that generates the de-oiled flour. Another embodiment of the dryer 518 may be a vacuum dryer. Another embodiment may utilize a desolventizing toaster in operation with the vacuum dryer.

The variances of elements noted in FIGS. 9 and 10 provide for a large number of varying embodiments. It is within the scope of this process for utilizing any variation of the devices 512, 514, 516, 518 and 540. For example, one embodiment may include a roller miller/flaker 512 with a mixer 514, decanter centrifuge 516 and a vacuum dryer 518. For example, another embodiment may include a flour mill 512, a countercurrent extraction unit 540 and an air-nitrogen air-flow dryer 518. Such examples are illustrative in nature only and not limiting.

Therein, the process of decortication with milling and/or roller-flaking of the feedstock and ethanol-based extraction results in efficient processing of the protein source while preserving the food grade nature of all fractions. The above embodiment is described with chickpeas, but is also operable on other members of legume family, as well as any suitable feedstock having an oil content.

Figure 11:
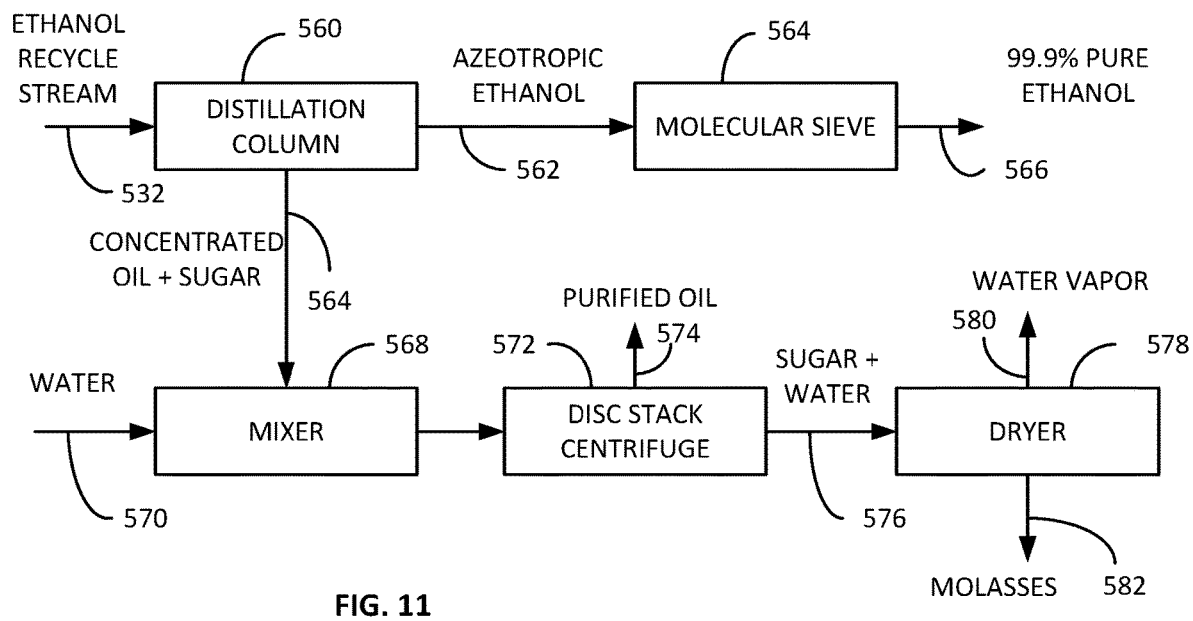
FIG. 11 illustrates a block diagram of one embodiment of an ethanol recycling loop for use in conjunction with the de-oiling processor.

FIG. 11 illustrates one embodiment of an ethanol recycling loop usable with the processor 502 of FIGS. 8-10. The recycling loop receives the ethanol recycling stream 532, consisting of oil extracted from the material, ethanol and sugar. A distillation column 560 separates the input 532 into azeotropic ethanol 562 and concentrated oil, sugar and other organics 564. In one embodiment, molecular sieves may be used to extract water from the ethanol 566. Such ethanol can then be recycled back to the mixer 528 of FIG. 9 and/or the countercurrent extraction unit 540 of FIG. 10.

In FIG. 11, a mixer 568 receives both the concentrated oil and sugar 564 as well as water 570. A disc stack centrifuge 572 receives the mixture and output purified oil 574 and sugar and water mixture 576. A dryer 578 dries the input 578 to produce water vapor 580 and molasses 582. In one embodiment, an optional enzymatic process may be performed prior to the dryer 578. Regardless, in the system of FIG. 11, the ethanol 566 can be recycled and re-used in the de-oiling process. It is recognized by one skilled in the art that further variations of the recycling operations may be utilized.

Figure 12:
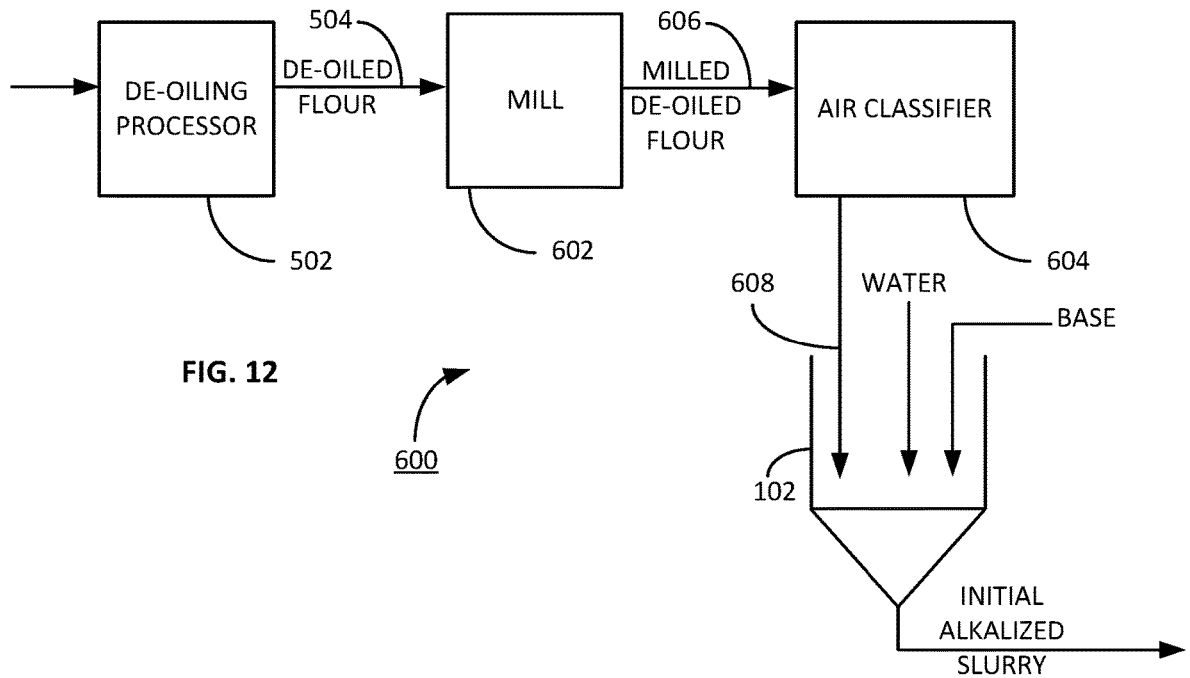
FIG. 12 illustrates a block diagram of one embodiment of a dry fractionation system.

Further processing of the protein source provides for the improvement of yield and purity of the protein concentrates. As described herein, the exemplary protein source is chickpea, but any other plant-based protein source may be utilized. The present processing is not expressly limited to chickpeas, but using chickpeas as one exemplary embodiment. FIG. 12 illustrates one embodiment of a system for improving protein concentrate yields and purity, complimentary to the systems and methods described above. The system 600 of FIG. 12 may operate prior to the mixer 102 as noted above in FIG. 1. The system 600 of FIG. 12 may additionally receive de-oiled protein flour, such as flour 502 generated from the de-oiled processor 502 described above.

The system 600 includes a mill 602 and an air classifier system 604. The mill 600 may be any suitable milling device, such as by way of example of a jet mill, hammer, pin or any other suitable device recognized by one skilled in the art. The air classifier 604, as described in further detail below, may be one or more air classification systems operative to process and classify the concentrate output within a defined classification range.

In the operation of the system 600, the mill 602 receives the de-oiled flour 504 and generates milled de-oiled flour 606. In an exemplary embodiment, the particle size can range between 5 and 100 micron, but it is recognized that any other suitable particle size range is within the scope herein. It is further noted that while the system 600 illustrates the mill 602 receiving the de-oiled flour 504, the mill may additionally process flour not having been subjected to the de-oiling process of FIGS. 9-11, such that generated milling output 606 would then be milled flour instead of milled de-oiled flour 606.

The air classifier 604 therein performs air classification operations, such as described in FIG. 13 below. The classification process therein generates a protein concentrate 608, which with respect to the above-described protein extraction process, may then be received by the mixer 102, along with water and base to produce the initial alkalized slurry. It is recognized that in the embodiment where the protein concentrate 608 is from the milled de-oiled flour, the subsequent processing of FIG. 1 therein excludes creamer 106 similar to the de-oiled embodiment described above. It is further noted that in some protein sources having a high oil content, the oil content can disrupt the efficiency of the milling process by causing the mill to operate at a slower pace to avoid getting gummed up, such that by de-oiling the flour to lower its oil content, and remove attendant moisture, the milling operations can operate more efficiently, as well as eliminate oil removal processing operation(s) at later protein extraction stage(s).

For clarity of terminology, as described herein, the air classification technique generates varying outputs of protein concentrates. By comparison, the protein extraction process, such as described herein including FIG. 1 for example, generate protein concentrate product. The protein concentrates from the air classification systems undergo further processing to generate the protein concentrate product. Therefore, in reference to air classifications, the protein concentrates are the air classification output, separate from the protein concentrate product. Whereby, it is noted that the protein concentrate product, as generated herein, may be sold or otherwise distributed for consumption or processed for manufacturing of food products. Similarly, the protein concentrates from the air classifier(s) may additionally be sold or otherwise distributed for consumption or processed for manufacturing of food products.

Figure 13:
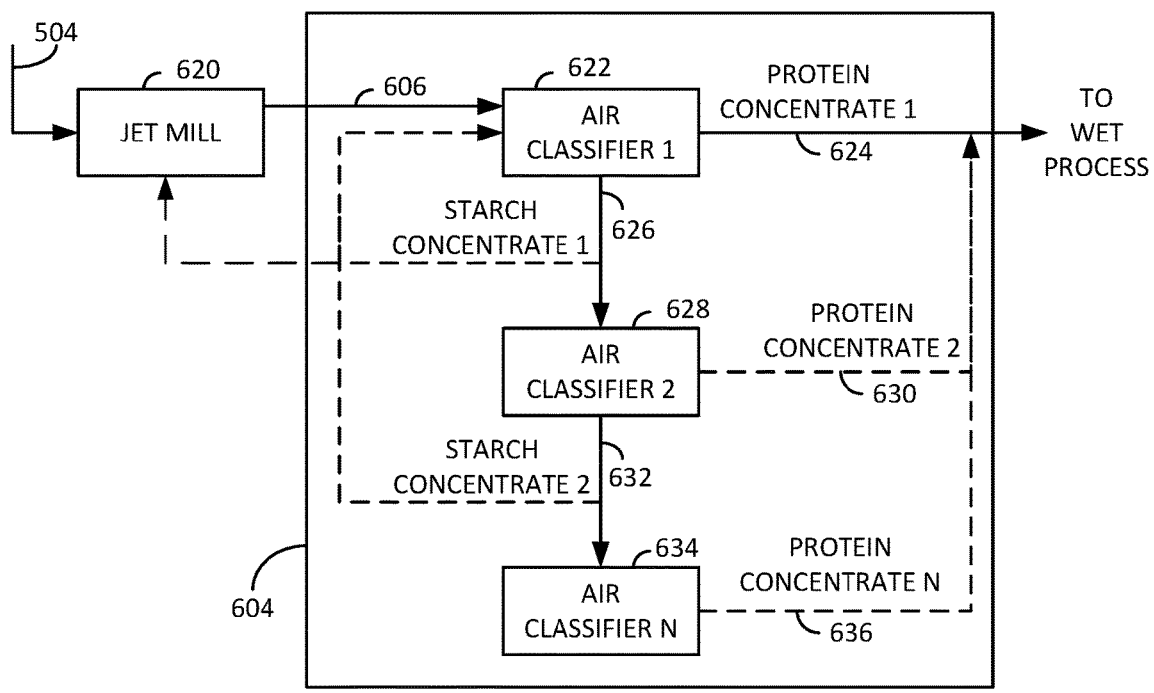
FIG. 13 illustrates multiple embodiments of the dry fractionation system.

FIG. 13 illustrates multiple embodiments of the air classifier 604, as well as the exemplary jet mill 620, as one embodiment of the mill 602 of FIG. 12. The mill 620 receives the flour 504, generating milled flour 606. A first air classifier 622 receives the milled flour 606 to generate a first protein concentrate 624. By way of example, the classifier 622 may be a Netzch Model CFS30 manufactured by Netzch Inc. of Exton, Pa. The classifier 622 may have a designated percentage target split of to fines based on desired protein concentrate. In this example, the light fraction in the first air classifier 622 may be between 15% and 50% split. The air classification generates the protein concentrate 624 and a starch concentrate 626, using known air classification techniques.

In one embodiment, the starch concentrate 626 is then re-fed back to the air classifier 622 for further refinement and processing.

In one embodiment, the generation of the protein concentrate 624 may therein be sufficient for the protein extraction process described above. Whereas, further refining the protein concentrate 624 produces a higher purity level of the protein concentrate used for the wet process. For example, if the protein concentrate 624 is fed to another air classifier, this can improve the purity level by extracting further starch concentrate, leaving a higher purity level in the protein concentrate.

In further embodiments, additional processing of the starch concentrate 626 and further air classifiers may produce higher yields of protein concentrate. In one embodiment, the air classifier 604 includes a second air classifier 628, which receives an input of the starch concentrate 626. The second air classifier 628 therein performs further air classification operations to generate a second protein concentrate 630, which extracts further protein from the starch concentrate 626, improving the yield of protein concentrate from the flour 606. In one embodiment, the concentrate 630 may then be added into the protein extraction process along with the first protein concentrate 624.

The second air classifier 628 additionally generates a second starch concentrate 632. This second starch concentrate 632 may be feed back to the first air classifier 622 for further refinement. In an additional embodiment, the starch concentrate from an air classifier may be fed back to the mill 620. For example, starch concentrate 626 from the first air classifier 622 may include particles whereby the protein was not sufficiently removed from the starch granules in a first pass. Thereby, in this embodiment, reprocessing the starch concentrate 626 back through the mill 620 can improve protein capture yields.

In a further embodiment, any suitable number of air classifiers may be used, illustrated here as air classifier N 634, where N may be any suitable integer. For example, to maximize yield, a process may include four or five air classifiers operating to generate the protein concentrate, such as concentrate 636. It is recognized that additional air classifiers operate on the starch concentrate produced by the previous air classifier, so it there is a degree of diminishing returns for producible yield using multiple air classifiers on starch concentrates. Similarly, while not expressly illustrated in FIG. 13, additional air classifiers may be used on the protein concentrate 624, 630 and/or 636 to improve the purity of the protein concentrate.

By way of example, one embodiment may include the first air classifier 622 generating a concentration split of 15-50% by feed mass to the starch concentrate 626 and the protein concentrate 624 can be greater than 45%. The second air classifier 628 may additionally split 15-50% by feed mass to the starch concentrate 632 and protein concentrate 630 can be greater than 55% purity. A third air classifier 634 may generate the same split of 15-50% to the starch concentrate and protein purity greater than 65%. The further air classification of the starch concentrate improves yield by separating additional protein concentrate.

Similarly, in one embodiment, a range for the split by weight between the protein concentrate 624 and the starch concentrate 626 may be approximately 35% by weight of the protein rich fraction, the protein concentrate 624 and approximately 65% by weight of the starch concentrate 626, plus or minus 15% each. Therein, in this embodiment, the concentration of the protein concentrate 624 may be 65% protein on a dry basis with a range of +/−15%. In this embodiment, the protein concentration of the starch concentrate may be 10%+/−5%. Therefore, this air classification process may be repeated one or more times to further extract additional protein concentrate, to improve yield and/or purity. For example, the protein concentrate 624 can be further air classified to remove particles finer and lighter than the protein at a split of approximately 3-10% to fine fraction. Upon further air classification, the starch concentrate may be ash, such as fibers, inorganic materials or other matters, or other insoluble materials, leaving the higher purity protein concentrate.

Figure 14:
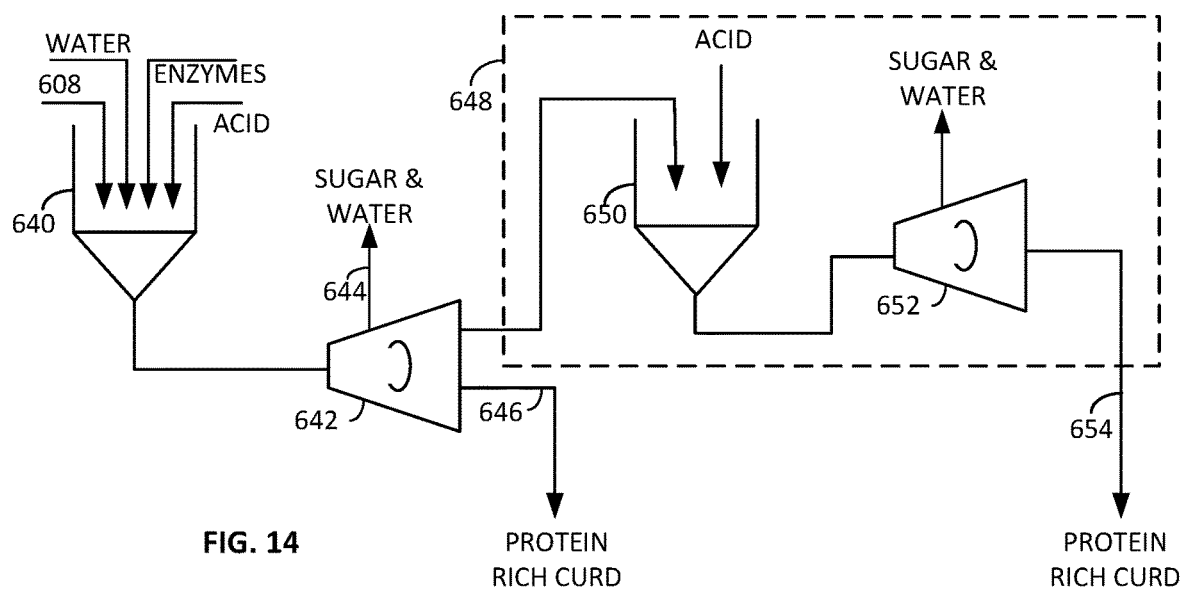
FIG. 14 illustrates multiple embodiments of protein extraction using dry fractionation.

FIG. 14 illustrates several embodiments for processing the protein concentrate 608. As noted above, the concentrate 608 may be protein concentrate 624 by itself of in combination with concentrates 630 or 630 and 636, in various embodiments illustrated in FIG. 13. A mixer 640 receives the concentrate 608, water, acid and enzymatic cocktail. In one embodiment, the enzymatic cocktail includes enzymes and is composed of a carbohydrate specific cocktail, such as by way of example pectinase, amylase, gluco-amaylase, cellulose, or any other suitable mixture recognized by one skilled in the art.

The mixer 640 mixes the liquids and provides the mixture to a centrifuge 642. In one embodiment, the centrifuge 642 separates the mixture into a water and sugar output 644, leaving protein rich curd 646. The protein rich curd 646 may then be further processed for protein extraction, as described in further detail below.

In another embodiment, the input to the mixer 640 may omit the enzymes. The mixture of the protein concentrate 608, water and acid is then fed to the centrifuge 642. Where the centrifuge 642 extracts the sugar and water 644, the protein rich curd output is then provided to a second processing stage 648. In this embodiment, the second processing stage 648 includes a second mixer 650 and a second centrifuge 652. The protein rich curd is mixed in the second mixer 650 with an acid, and feed to the centrifuge 652. Sugar and water is extracted, to generate a second protein rich curd 654 output. Similar to the protein rich curd 646, the curd 654 is then further processed for protein extraction.

Figure 15:
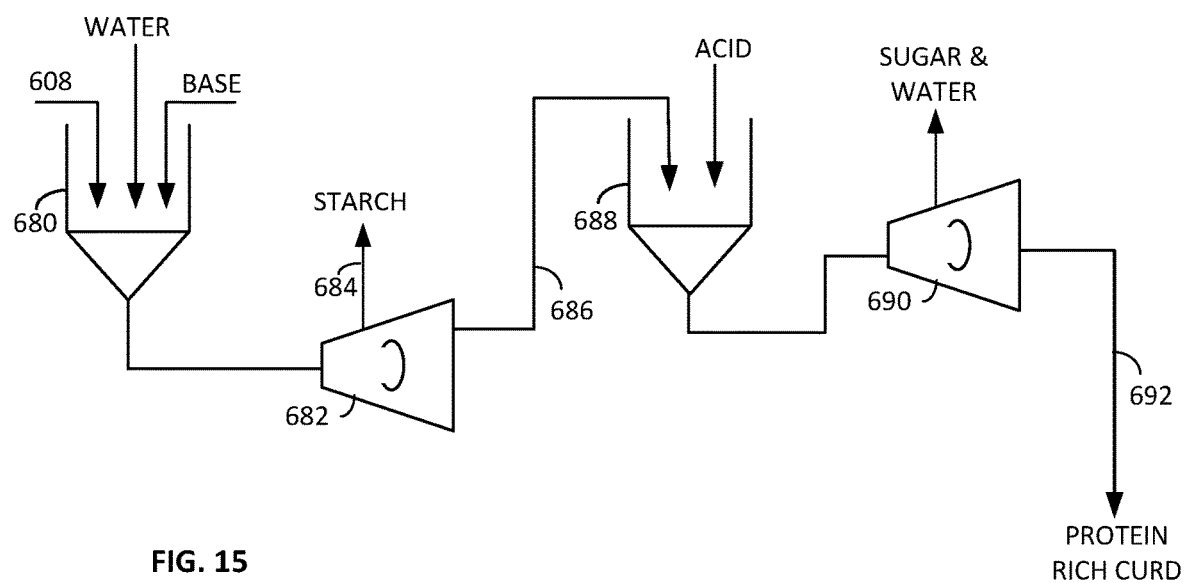
FIG. 15 illustrates another embodiment of protein extraction using dry fractionation.

With respect to FIG. 1, the processing techniques of FIGS. 14-15 are integrated therein. Varying embodiments of protein extraction using the air classification utilize the FIG. 1 processing system 100, including additional or further refinements of the process. For example, with respect to FIG. 14, mixer 640 may operate similar to the mixer 108, therein additionally receiving the enzyme mixture. The centrifuge 642 operates similar to the separator 110, generating the rich protein curd 646, referred to as first protein curd with reference to FIG. 1 above. The wash station 112 of FIG. 1 may operate consistent with the second processing stage 648 of FIG. 12, as further described in FIG. 2 above. Such that the protein rich curd 654 may be consistent with the second protein curd of FIG. 1.

The protein rich curd 646 and/or 654 may be provided to the mixer 114, which includes an enzyme cocktail as noted above.

FIG. 15 illustrates another embodiment for processing the protein concentrate as generated consistent with one or more embodiments above. A mixer 680 receives the protein concentrate 608 along with water and a base. The mixture is fed to a centrifuge 682, whereby starch 684 is extracted. With starch extracted, a solubilized protein rich stream 686 is then fed to a second mixer 688. Within the mixer 688, the stream 686 is combined with acid. The output of the second mixture is fed to a second centrifuge 690, whereby sugar and water is extracted to generate the protein rich curd 692.

FIG. 15 illustrates a similar commonality with the system of FIG. 1, where the mixer 680 operates consistent with the mixer 108 of FIG. 1, having the input of water and base, instead of acid. By replacement of acid with a base, the centrifuge 682 operates similar to the separator 110, to extract the protein curd 686, which is similar to the first protein curd of FIG. 1. The mixer 688 and centrifuge 690 operates similar to the wash station 112 of FIG. 1, whereby the protein rich curd 692 is similar to the second protein curd of FIG. 1.

Similar to the embodiments of FIG. 14, the curd 692 is then further processed for protein extraction, consistent with the above-described techniques. For example, the curd 692 may be fed to the mixer 114 of FIG. 1 with the inclusion of an enzyme cocktail.

As noted herein, wherein the described embodiment of an extraction unit is a centrifuge, it is recognized that any other suitable extraction or separator device may be utilized and the technique herein is not expressly limited to using a centrifuge.

Therefore, the above air classification technique provides for improving protein yield usable for protein extraction from plant-based source(s) such as chickpeas, other legumes and other like feedstocks. A maximum protein concentration is reached in which no further protein can be concentrated without sacrificing yield, or in various embodiments a maximum cannot be overcome due to particles or agglomerates having the same mass cannot be separated in a dry media. The present technique therein introduces materials into a solvent to separate materials by other physio-chemical properties.

It is recognized that varying the processing conditions noted above adjusts the output volume and concentrate levels. Whereas within the scope of the present invention, reducing processing time or reducing ingredient combinations may generate reduced concentration levels acceptable for varying industrial or commercial uses. Similarly, refinements may include increased quality or other attributes of the protein concentrate, such as digestibility, after taste/ aromatics, consistency, mouth-feel, by way of example. As such, the varying operational variations are within the scope of the present invention and the noted example and ranges above are exemplary and not limiting in their disclosure.

In addition the method and system described herein, the present method and system additionally allows a chickpea concentrate made by the process described herein. The chickpea concentrate is made, in various embodiments, using the above described methods and systems.

Therefore, the present method, system and chickpea concentrate overcomes the limitations of the prior art by allow for the utilization of chickpea as a vital protein source. The method and system incorporate varying operational guidelines, such as acidity levels, processing times, flow rates, temperature ranges, to generate the herein described chickpea concentrate.

As described herein, the present technique provides for the removal of anti-nutritionals as well as increasing the nutritional profile from plant-based protein sources. As further noted in the exemplary embodiment of fava beans, the present technique provides for the removal of vicine/ covicine from fava beans, thus allowing for the utilization of fava beans as a viable source for plant-based protein powder.

Figure 16:
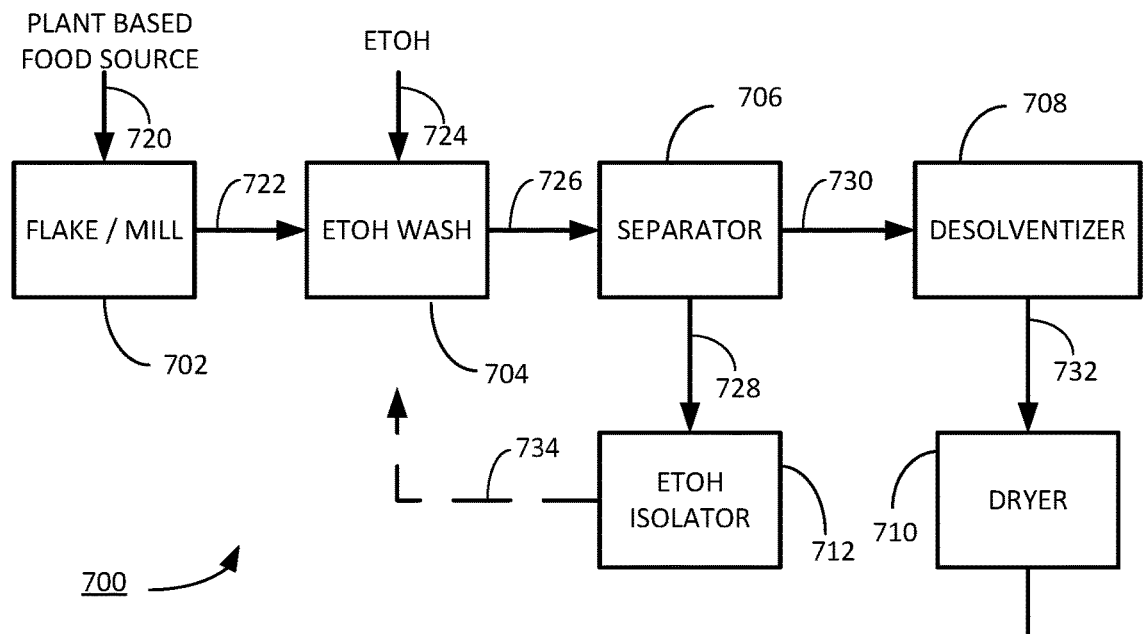
FIG. 16 illustrates one embodiment of a system for removing anti-nutritionals from a feed stock.

FIG. 16 illustrates one embodiment of a processing system and methodology for anti-nutritional removal. The system 700 includes a feed stock generation device 702, an ethanol wash unit 704, a separator 706, a desolventizer 708, a drying unit 710 and an ethanol isolator 712.

The feed stock generation device 702 may be a flaking device, milling device, or any other suitable device for generating the feed stock. The feed stock includes an initial processing of the food source, such as the example of the food source being whole fava beans and the feed stock is flaked or milled fava beans. As described in further detail below, the device 702 may be adjusted for generating feed stock having prescribed sizes, such as flakes having defined dimensions or milling feed stock to defined granularity.

The ethanol wash unit 704 may be any suitable unit for combining ethanol with the feed stock generated by the device 702, including for example a counter-current extractor or an immersion blender. The separator 706 may be any suitable device providing for separating out the ethanol. The desolventizer 708 may be any suitable device or combination of devices for removing solvent residue from the output of the separator 706.

The dryer 710 may be one or more suitable devices for performing drying operations as recognized by one skilled in the art. The ethanol isolator 712 may be one or more suitable devices for performing ethanol extraction.

The present embodiment is described using the exemplary embodiment of ethanol as the solvent. This embodiment is exemplary in nature and not expressly limiting, as other solvents may be utilized for the removal of anti-nutritionals using the techniques described herein.

In one embodiment of the operation of the system 700, using the embodiment of the fava bean protein source, the fava beans are provided as the input source 720 to the device 702. The device 702 operates consistent with normal operations, generating a feed stock output 722, such as the example of a milled feed stock or a flaked feed stock.

In one embodiment, flakes can vary in thickness from 0.30 to 0.75 mm dependent and addressed on the basis for what optimized feedstock parameters are for the respective extractor type. To one skilled in the art, it is advantageous to minimize the "white flake" thickness as much as possible to decrease the diffusion path for anti-nutritional factors out of the solid matrix. In one such embodiment, in which a percolation style counter current extractor is used, a flake thickness target of 0.35 mm is specified. In another embodiment, with an immersion style counter current extractor, a flake thickness of 0.7 mm was acceptable. If a flour meal, and not flake is the feedstock output of device 702, the surface to volume ratio would be substantially higher than that of a flake. Under this embodiment, diffusion distance of the anti-nutritional factors out of the solid matrix would be greatly reduced when compared to flakes; therefore, primary considerations would be placed on the impact on mill size as it relates to other downstream processing, such as bulk density, mass flow, and air classification efficacy. In such embodiment, particle sizes can range between 50 and 3000 microns with effective results. It is noted the herein described ranges are exemplary in nature and not expressly limiting in scope.

Figure 17:
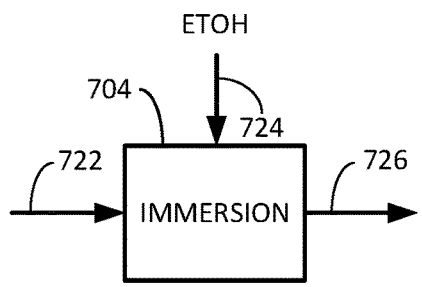
FIG. 17 illustrates another embodiment of the system of FIG. 16.

The ethanol wash device 704 receives the feed stock 722 and an ethanol input 724. Different embodiments provide for washing or saturating the feed stock 722 with the ethanol input, including a first volume of ethanol. For example, FIG. 17 illustrates the embodiment of using an immersion device 704a combining the feed stock 722 and ethanol 724 to generate the ethanol slurry 726. In another example, FIG. 18 illustrates the embodiment of using a counter-current extractor 704b to combine the feed stock 722 and ethanol 724.

Figure 18:
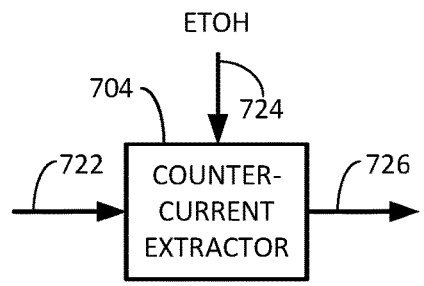
FIG. 18 illustrates another embodiment of the system of FIG. 17.

In these embodiments of FIGS. 16-18, the ethanol wash provides for the migration of the vicine and covicine, along with other compounds, from the feed stock. Within the ethanol wash, the vicine and covicine, along with other compounds, migrate into the ethanol micella. It is further recognized that in alternative embodiments, the compounds may be destroyed or altered by the H-bond disruption caused by the anhydrous ethanol, reducing or eliminating that which may migrate into the ethanol micelle. Thus, the combined mixture generates the ethanol slurry 726.

In varying embodiments, the ethanol wash 704 is an explosion proof immersion and/or counter-current extractor having a soak time of the feed stock and ethanol between 1-8 hours and a temperature control range of 55 degrees Centigrade to 65 degrees Centigrade. Whereas, it is recognized that varying soak times and temperature ranges may be varied, the above examples are not expressly limiting in scope.

In the embodiment using an immersion blender, the separator 706, may be a counter-current extractor extracting and separating the processing of the feed stock 722 and ethanol 724 into an ethanol slurry and then into an ethanol matrix 728 and a feed stock mass 730. In this exemplary embodiment, the feed stock mass 730 is a fava bean mass. As recognized by one skilled in the art, technically, in counter-current, the extraction and separation occur within the same unit. For immersion i.e. tank then decanter, the extraction takes place in the tank and the separation takes place in the separator, or decanter.

In one embodiment, the extractor 704 is an agitated tank followed by separator 706, which is an explosion proof decanting centrifuge. In varying embodiments, the extractor 704 operates at a temperature control range of 20 degrees Celsius to 65 degrees Celsius. Whereas, it is recognized that temperature ranges may be varied, the above examples are not expressly limiting in scope. As part of another embodiment, steps 704 and 706 can be achieved within the same unit by use of a counter-current extractor. In varying embodiments, the starting temperature may be lower or higher than then above-noted 20 degrees, as the above temperature range provides exemplary operational ranges and is not an expressly limiting operating range.

The fava bean mass 730 is fed to the desolventizer 708, whereby remaining solvents in the mass 730 are extracted. The desolventizer operates in accordance with known techniques, generating a desolventized feed stock mass 732. This mass 732 is fed to the dryer 710, which operates using known drying techniques to generate the clean feed stock having at least a portion of the anti-nutritionals removed. For example, one embodiment may include using batch wise or a continuous operating vacuum dryer. In the embodiment of fava beans, the vicine and covicine are substantially removed therefrom.

Further illustrated in FIG. 16, one embodiment includes the recapture of the solvent, which in the present embodiment being ethanol. The isolator 712 operates to receive the ethanol matrix 728 from the separator 706. The isolator 712 may therein isolate out the ethanol using any number of techniques, including for example evaporation. The ethanol can be extracted, generating the recovered ethanol stream 734 and the anti-nutritionals 736.

In one embodiment, the recovered ethanol 734 may be fed into the wash device 704 in combination with ethanol 724 or in place thereof. For example, the system 700 may continuously re-use an existing ethanol volume, with intermittent supplementation as necessary, for conversation purposes. Therefore, the system may operate using the first volume of ethanol, or the first volume of ethanol can be based on either an external ethanol feed, recaptured ethanol, or a combination of the two.

In one embodiment, the recovered ethanol 734 may be feed into the wash device 704 in combination with ethanol 724 or in place thereof. For example, the system 700 may continuously re-use an existing ethanol volume, with intermittent supplementation as necessary, for conversation purposes. Therefore, the system may operate using the first volume of ethanol, or the first volume of ethanol can be based on either an external ethanol feed, recaptured ethanol, or a combination of the two.

The ethanol may be extracted and subsequently recycled for further anti-nutritional removal operations. Having an ethanol phase with organics in it, the solvent removal operations may include evaporation of the ethanol prior to washing out an oily organic phase with acidic or caustic water. The ethanol stream may be fed to an evaporator to evaporate off the ethanol. The evaporation may be prior to one or more wash stations. For example, a first wash station may be an acid wash station. The mixture of an acid to the ethanol matrix having vicine/covicine therein causes the vicine to crystalize. In one embodiment, the acid provides for the vicine to crystalizes at a pH between 3.8 and 4.3. Thus, the acid provided for the wash provides for a pH level within the requested range. A next step is a decanting out the vicine, leaving ethanol having covicine therein.

A second wash station may be a base wash station. The mixture of a base to the ethanol matrix causes the covicine to crystalize. In one embodiment, the base provides for covicine to crystalize at a pH between 7.0-8.0. A next step is decanting out the covicine.

While the above embodiment is described using ethanol, this embodiment is not expressly limiting in nature. Rather, various other solvents may be utilized, including but not limited to, hexane, isopropyl alcohol, methanol, or aqueous blends thereof. With the variations in solvents, there may be corresponding variations in the operational aspects of the system 700. For example, in the extractor 704, the wash time and temperature range can be adjusted consistent with chemical properties attendant for the selected solvent(s).

Furthermore, the system of FIG. 16 (and FIGS. 17-18 as alternative embodiments) provides the clean feed stock for subsequent protein extraction. Using the exemplary embodiment of fava beans, the clean fava bean feed stock can then be further processed for protein extraction. Thus, the subsequently extracted protein is devoid of anti-nutritionals.

By way of example, the clean feed stock 734 can be feed into the mixer 102 of FIG. 1 for further processing as described above. For example, with respect to FIG. 1, the flour having anti-nutritionals removed may be feed into the mixer 102 with flour and a base to generate the initial alkalized slurry. The flour is then processed using one or more embodiments of the protein extraction techniques to extract the dried protein concentrate. In another embodiment, the feed stock generated by the dryer 710 can be milled and air classified to generate a protein concentrate. Therefore, the present method and system provides for not only generating clean feed stock having nutritionals removed, but also optional protein extraction therefrom.

Figure 19:
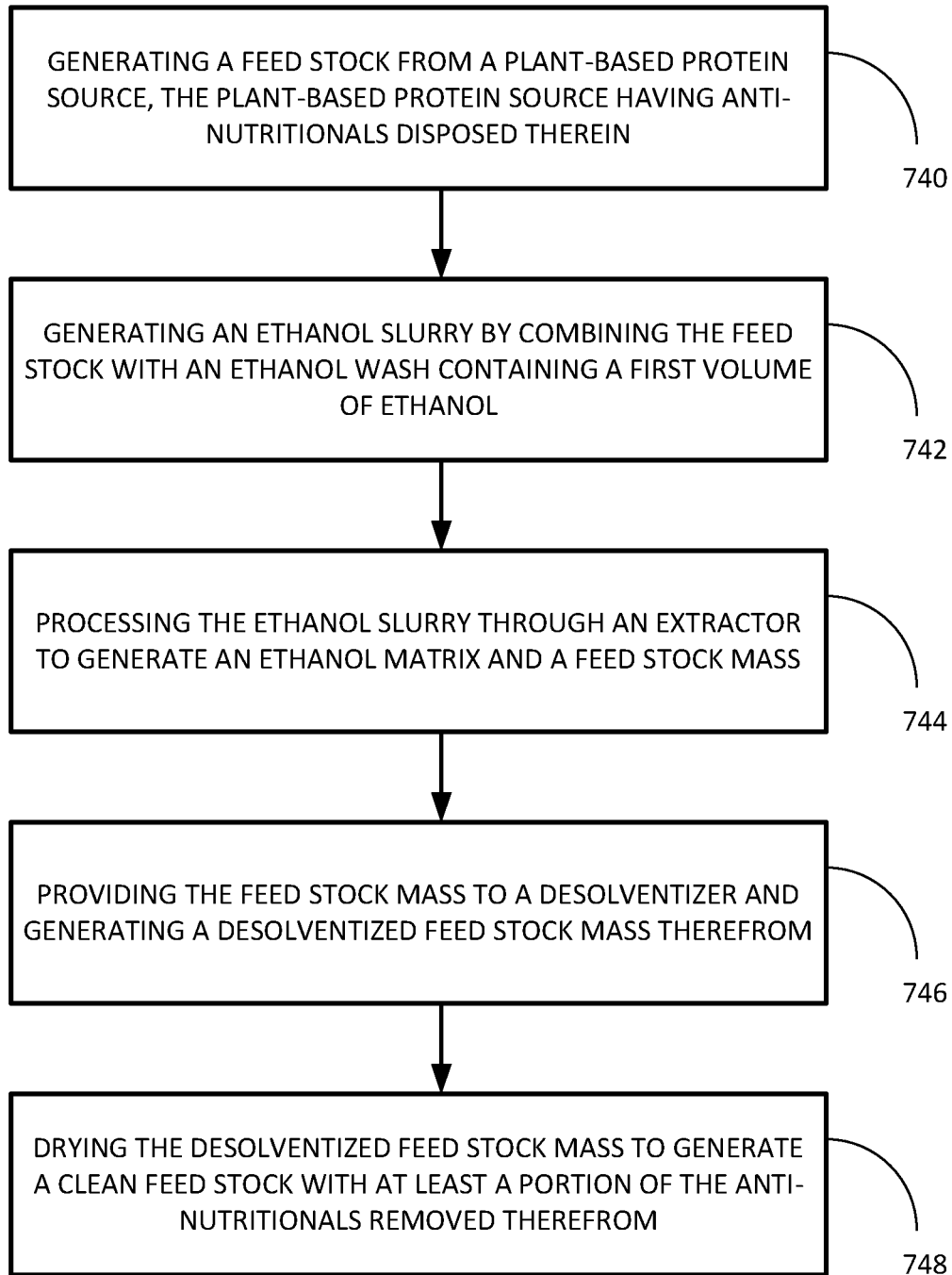
FIG. 19 illustrates a flowchart of the steps of one embodiment of a method for anti-nutritional removal.

FIG. 19 method a flowchart of the steps of one embodiment of a method for anti-nutritional removal. The method may be performed using the system of FIGS. 16-18 as described above. A first step, step 740, is to generate a feed stock from a plant-based protein source, the plant-based protein source having anti-nutritionals disposed therein. In the exemplary embodiment of the protein source being fava beans, the anti-nutritionals may include vicine and covicine natively found with the fava beans.

Step 742 is generating an ethanol slurry by combining the feed stock with an ethanol wash containing a first volume of ethanol. As referenced in FIG. 16, the ethanol wash device 704 may receive the ethanol 724 and the feed stock 722 to generate the slurry 726.

Step 744 is processing the ethanol slurry through an extractor to generate an ethanol matrix and feed stock mass. Again, with reference to FIG. 16, the extractor 706 generates the feed stock mass 730 and the ethanol matrix.

Step 746 is providing the feed stock mass to a desolventizer and generating a desolventized feed stock mass. Therein, step 748 is to dry the desolventized food stock mass to generate a clean feed stock with at least a portion of the anti-nutritionals removed. Wherein, the present method applies to any suitable food source, not exclusively fava beans. Moreover, varying embodiments may use solvents different from ethanol, as described herein.

Moreover, it is noted that the clean feed stock can be either having specifically anti-nutritionals removed or having a portion of anti-nutritionals removed. For example, it is not uncommon for anti-nutritional techniques to leave trace amounts of anti-nutritionals. The removal of anti-nutritionals, including the amount or percentage of removal can be integrated into the system and method design. For example, techniques for complete removal may require high solvent concentrations, longer soak times, maybe iterative steps, etc. Whereas, techniques for removing a percentage of anti-nutritionals such as removal for being within accepted commercial or dietary guidelines, may change processing parameters. Therefore, the clean feed stock may include residual anti-nutritionals, but their amounts are of such low percentage to not adversely affect the feed stock or subsequent protein extracted therefrom.

In addition to the above examples of vicine and covicine, other anti-nutritional factors may be eliminated or significantly reduced during the extraction and isolation process including the removal of compounds impacting color, taste, glycemic index (such as problematic oligosaccharides such as raffinose and stacchyose, polyphenols, tannins, saponins, peptides, esters, ethers etc. The extraction and isolation process has been shown to be beneficial for other types of plant-based feed stocks such as chickpea, mung bean, lentil and hemp as examples of other pulse and seed oil crops.

FIGS. 1 through 19 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

The invention claimed is:

1. A method for anti-nutritional removal comprising:
   generating a feed stock from a plant-based protein source of fava beans, the plant-based protein source having anti-nutritionals including vicine and covicine disposed therein;
   generating an ethanol slurry by combining the feed stock with an ethanol wash containing a first volume of ethanol;
   processing the ethanol slurry through an extractor to generate an ethanol matrix and a feed stock mass;
   providing the feed stock mass to a desolventizer and generating a desolventized feed stock mass therefrom;
   drying the desolventized feed stock mass to generate a clean feed stock with at least a portion of the anti-nutritionals removed therefrom; and
   processing the clean feed stock for generating a protein source output having at least a portion of the anti-nutritionals removed therefrom including having at least a portion of the vicine and covicine removed therefrom.

2. The method of claim 1, wherein generating the feed stock includes at least one of: flaking and milling the plant-based protein source.

3. The method of claim 1, wherein the plant-based protein source output is in the form of at least one of: flakes, meal and powder.

4. The method of claim 1 the method further comprising:
   providing the ethanol matrix to an evaporator for recovering the ethanol therefrom, wherein the evaporator is separate from the desolventizer.

5. The method of claim 4 wherein the ethanol is recovered via evaporation and refed with the ethanol wash.

6. The method of claim 1, wherein the anti-nutritionals include vicine and covicine.

7. The method of claim 1, wherein the generating of the ethanol slurry is performed using at least one of: an immersion blender and a counter-current extractor.

8. The method of claim 1, wherein processing the clean feed stock for generating a protein source output includes:
   generating an initial alkalized slurry by combining the clean feed stock, water and a base using a first mixer;
   transporting the initial alkalized slurry from the first mixer to a first separator using a first low shear pump,
   generating a solubilized protein rich stream by separating the initial alkalized slurry from a starch precipitate in the first separator;
   generating a de-oiled solubilized protein rich stream by separating out oil from within the solubilized protein rich stream;
   generating a protein precipitate including an acid curd by mixing the de-oiled solubilized protein rich stream with an acid using a second mixer and separating the acid curd from the protein precipitate;
   washing the first protein curd using a wash station to generate a second protein curd;
   generating a neutral hydrolyzed protein slurry by mixing the second protein curd with a base and water using a third mixer;
   generating a homogenized protein slurry from the protein slurry;
   generating a pasteurized protein slurry from the homogenized protein slurry by pasteurizing the homogenized protein slurry;
   cooling the pasteurized protein slurry to generate a cooled protein slurry therefrom; and
   recovering the protein concentrate from the cooled protein as the protein source output.

9. A method for removing of vicine and covicine from fava beans, the method comprising:
   processing the fava beans to generate a feed stock, wherein the fava beans have vicine and covicine disposed therein;
   generating a solvent slurry by combining the feed stock with a solvent wash containing a first volume of solvent;
   processing the solvent slurry through an extractor to generate a solvent matrix and a feed stock mass;
   providing the feed stock mass to a desolventizer and generating a desolventized feed stock mass therefrom; and
   drying the desolventized feed stock mass to generate a clean feed stock with at least a portion of the vicine and covicine removed therefrom.

10. The method of claim 9 further comprising:
    processing the clean feed stock for generating a protein source output in the form of at least one of: flakes, meal and powder.

11. The method of claim 10, wherein the processing the clean feed stock includes:
    generating an initial alkalized slurry by combining the clean feed stock, water and a base using a first mixer;
    transporting the initial alkalized slurry from the first mixer to a first separator using a first low shear pump,
    generating a solubilized protein rich stream by separating the initial alkalized slurry from a starch precipitate in the first separator;
    generating a de-oiled solubilized protein rich stream by separating out oil from within the solubilized protein rich stream;
    generating a protein precipitate including an acid curd by mixing the de-oiled solubilized protein rich stream with an acid using a second mixer and separating the acid curd from the protein precipitate;
    washing the first protein curd using a wash station to generate a second protein curd;
    generating a neutral hydrolyzed protein slurry by mixing the second protein curd with a base and water using a third mixer;
    generating a homogenized protein slurry from the protein slurry;
    generating a pasteurized protein slurry from the homogenized protein slurry by pasteurizing the homogenized protein slurry;
    cooling the pasteurized protein slurry to generate a cooled protein slurry therefrom; and
    recovering the protein concentrate from the cooled protein as the protein source output.

12. The method of claim 9 further comprising:
    providing the solvent matrix to an evaporator for recovering the solvent therefrom, wherein the evaporator is separate from the desolventizer.

13. The method of claim 9, wherein the solvent includes at least one of: ethanol, hexane, and isopropyl alcohol.

* * * * *